United States Patent
Peitzke et al.

(10) Patent No.: US 8,593,012 B2
(45) Date of Patent: Nov. 26, 2013

(54) UTILITY SCALE ELECTRIC ENERGY STORAGE SYSTEM

(75) Inventors: William R. Peitzke, Montecito, CA (US); Matthew B. Brown, San Diego, CA (US); William L. Erdman, Moraga, CA (US); Robert T. Scott, Shorewood, IL (US); William H. Moorhead, Smithfield, VA (US); Douglas C. Blodgett, Pleasanton, CA (US); David I. Scott, Frankfort, IL (US)

(73) Assignee: Advanced Rail Energy Storage, LLC, Seattle, WA (US)

( * ) Notice: Subject to any disclaimer, the term of this patent is extended or adjusted under 35 U.S.C. 154(b) by 628 days.

(21) Appl. No.: 12/852,504

(22) Filed: Aug. 8, 2010

(65) Prior Publication Data
US 2011/0037275 A1    Feb. 17, 2011

Related U.S. Application Data

(60) Provisional application No. 61/233,052, filed on Aug. 11, 2009.

(51) Int. Cl.
*B60L 1/00*     (2006.01)
*B60L 3/00*     (2006.01)
*H02G 3/00*     (2006.01)

(52) U.S. Cl.
USPC .......................................................... 307/9.1

(58) Field of Classification Search
USPC ............ 307/9.1, 82, 84, 86; 104/289; 105/35; 700/295
See application file for complete search history.

(56) References Cited

U.S. PATENT DOCUMENTS

| | | | |
|---|---|---|---|
| 4,858,513 A | 8/1989 | Kememy | |
| 5,642,270 A | 6/1997 | Green et al. | |
| 6,990,906 B2 | 1/2006 | Powell | |
| 7,191,710 B2 | 3/2007 | Powell | |
| 7,231,877 B2 | 6/2007 | Kumar | |
| 7,430,967 B2 | 10/2008 | Kumar | |
| 7,973,420 B2 | 7/2011 | Scott | |
| 2005/0173601 A1 | 8/2005 | Hestand | |
| 2005/0279242 A1 | 12/2005 | Maier et al. | |
| 2007/0272116 A1 | 11/2007 | Bartley et al. | |
| 2008/0021602 A1 | 1/2008 | Kingham et al. | |
| 2010/0084916 A1 * | 4/2010 | Kumar et al. ................. | 307/9.1 |

* cited by examiner

*Primary Examiner* — Carlos Amaya
(74) *Attorney, Agent, or Firm* — Felix L. Fischer

(57) ABSTRACT

A potential energy storage system incorporating multiple track mounted shuttle units having motor/generator drive bogies and structure with an integral transfer mechanism for removably carrying energy storage masses from a first lower elevation storage yard to a second higher elevation storage yard employing excess energy from the electrical grid driving the motors, removing the masses in the second storage yard for energy storage, retrieving the masses and returning the masses from the second storage yard to the first storage yard recovering electrical energy through the generators.

16 Claims, 21 Drawing Sheets

UTILITY SCALE ELECTRIC ENERGY STORAGE SYSTEM

REFERENCE TO RELATED APPLICATIONS

This application claims priority of U.S. provisional patent application Ser. No. 61/233,052 filed on Aug. 11, 2009 by William R. Peitzke and Matt Brown entitled UTILITY SCALE ELECTRIC ENERGY STORAGE SYSTEM, the disclosure of which is incorporated herein by reference.

BACKGROUND

1. Field

The present invention relates generally to electric power storage and generation. More particularly, the present invention provides a system for potential energy storage employing electrically driven rail consists (a consist is defined herein as multiple train car elements) carrying off loadable masses between lower and upper storage facilities for potential energy storage by employing electrical grid power to the consists for transport of the masses from the lower to upper storage facility and potential energy recovery and return to the electrical grid by electromagnetic regenerative braking of the consists during transport of the masses from the upper to lower storage facility with ancillary support including variable and reactive power support and regulation up and down trimming capability.

2. Related Art

The electric power grid is increasingly complex and the matching of power generation supply with power usage is a critical element in maintaining stability in operation. This issue is becoming more complicated with the addition of alternative energy generation sources such as wind power and solar power which have inherent issues with consistency of power production. The need for utility scale energy storage as a portion of the power supply grid is driven by increasing requirements for daily load shifting and power quality services including frequency regulation, voltage control, spinning reserve, non-spinning reserve and black start. It is presently estimated that energy storage power requirements in the US will approach 200,000 MW for load shifting and exceed 20,000 MW for power quality service.

Electrical energy storage may be accomplished using battery technologies, capacitor storage systems, kinetic energy storage systems such as flywheels or potential energy storage systems. Battery technology for Lithium ion batteries, flow batteries and Rechargeable Sodium-Sulfur batteries (NaS) are improving but typically will provide estimated capability only in the range of 50 MW or less. Similarly, capacitive storage systems on reasonable scale only provide between 1-10 MW of capability. Flywheel storage systems are also typically limited to less than 20 MW due to physical size and structural materials constraints.

Conventional potential energy storage devices consist of mechanical lifting devices raising weights against the force of gravity and Pumped Hydro, a method that stores energy in the form of water pumped uphill against the force of gravity. Mechanical lifting devices are limited in their height to a few hundred feet and therefore require large amounts of mass to store a significant amount of electric energy. This results in a very large cost, making these devices expensive and uneconomical. In Pumped Hydro, water is pumped from a lower elevation reservoir to a higher elevation; the stored water is then released through turbines to convert the stored energy into electricity upon demand. The round-trip storage cycle efficiency losses of such systems are typically in the range of 25% and the difficulties in permitting, constructing and operating makes pumped hydro difficult to implement. It can take more than a decade to construct such a system.

It is therefore desirable to provide potential energy storage with capability in the power generation range of 100-2,000 MW with high efficiency and reduced installation and capital investment requirements.

SUMMARY

The embodiments disclosed herein provide a highly efficient, utility scale energy storage system. Large masses are transported uphill to store energy and downhill to release it. An electrified steel railway network shuttles the masses between two storage yards of different elevations via electric powered shuttle units containing motor-generators combined in consists and operated by an automated control system. The exemplary embodiment incorporate a rail system having upper and lower storage yards with interconnecting track between the upper and lower yards and multiple control elements for configuring track routing in the system. Shuttle units have an electrical motor/generator interconnected to supporting wheels and incorporate a support structure and integral transfer mechanism for removably carrying the masses. The motor/generators on the shuttle units are interconnected to an electrical grid. A control system in communication with the electrical grid, the shuttle units and the rail system control elements executes a first control sequence to store energy when the electrical grid has excess power and executes a second control sequence for providing power to the electrical grid when additional power is required. The first control sequence causes selected shuttle units to retrieve masses located in the lower storage yard and, using the motor/generator as a motor drawing power from the grid, drive the selected shuttle units from the lower storage yard to the upper storage yard with the control elements configured to route the shuttle units which then offload the masses in the upper storage yard. The second control sequence causes selected shuttle units to retrieve masses located in the upper storage yard and, using the motor/generator as a generator, supply power to the grid by regenerative braking the selected shuttle units from the upper storage yard to the lower storage yard with the control elements configured to route the selected shuttle units which then offload the masses in the lower storage yard.

In exemplary embodiments, the masses are stored in the upper and lower storage yard suspended over storage yard tracks and each shuttle unit is received under selected masses. The transfer mechanism incorporates a support element carried by structure on each shuttle unit and received under the mass as stored to provide roll under loading.

In exemplary embodiments, a substation is connected to the grid to receive high voltage power and a trackside electrical distribution system is connected to the substation with transformers connected to the electrical distribution system at selected intervals. Power supply rails connect to the transformers with each power supply rail associated with a track in the rail system. Each shuttle unit includes contactors for connection to the power supply rails and a traction control unit (TCU). The TCU incorporates rectifier/inverter circuits for power control connected to the motor/generator and a control board for control of the rectifier/inverter circuits for acceleration, deceleration and steady state operation of the motor/generator. A first utility side rectifier/inverter and a second motor/generator side rectifier/inverter are employed with the control board controlling reactive power in the utility side rectifier/inverter for volt-ampere-reactive (VAR) adjustment to the electrical grid.

In certain embodiments, reversing bypass connectors responsive to a signal from the control board for selectively bypassing the rectifier inverter circuits with direct connection of the motor generator for shuttle units on a selected connecting power track to the power supply rail for synchronous operation after acceleration/deceleration of the shuttle units. Voltage adjustment in the system responsive to a utility signal for regulation up or regulation down is accomplished in each shuttle unit with asynchronous operation.

The disclosed embodiments allow a method for providing utility scale ancillary services using the rail system and shuttle units connected the electrical grid. Upon receiving a command for ancillary service, a selected set of the shuttle units is controlled for reactive power, acceleration and deceleration to interact with the electrical grid in satisfaction of the ancillary service command. If a command for ancillary service is a VAR command, the shuttle units, which have rectifier/inverter circuits to provide power to the motor generator, control reactive power in the rectifier/inverter circuits for VAR control adjustment to the electrical grid. If the ancillary service command is a regulation up/regulation down command, at least one power track in the connecting tracks is selected for asynchronous operation and the motor generator on shuttle units traversing the selected power track are controlled for regulation up or regulation down of power supplied to or stored from the grid.

DETAILED DESCRIPTION

Figure 1:
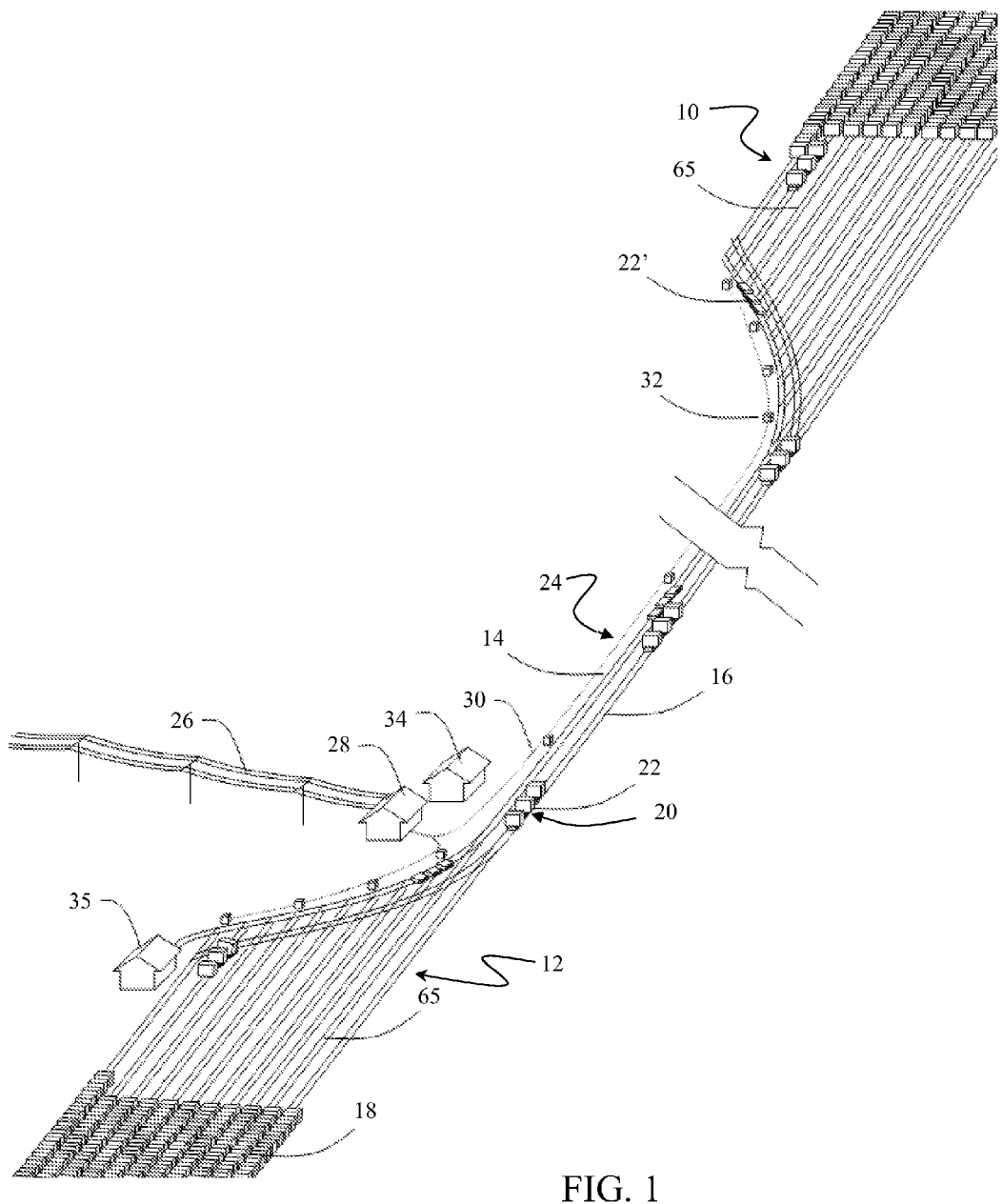
FIG. 1 is a perspective overview of an embodiment of the present energy storage system.

Referring now to the drawings for description of various embodiments in more detail, FIG. 1 shows an embodiment for the advanced rail energy storage (ARES) system having an upper storage yard 10, a lower storage yard 12 and connecting tracks 14 and 16. While only single power and return tracks are shown in FIG. 1, multiple tracks may be employed depending on system requirements as will be described in greater detail subsequently. Large masses 18 are transported between storage yards 10 and 12 by electric powered consists 20 which are multiple unit elements having one or more shuttle units 22 on an electrified steel railway network 24 created by tracks 14, 16, storing or releasing energy. The empty shuttle units (designated 22') are returned on the electrified steel railway network 24. The steel railway network incorporates multiple connecting track sets allowing bi-directional motion of loaded and empty shuttle units. During periods of storage or discharge a continuous flow of electric powered shuttle unit consists carry masses between storage yards. The steel railway network is connected to the local electricity grid via wires 26 connected to an electric substation 28 and distributed through trackside AC electrical distribution lines 30 and transformers 32 which provide power interconnection at approximately 1,060' intervals to power supply rails or "third rails", as will be described in greater detail subsequently, which incorporate a component of highly conductive material along their length such as aluminum or copper to avoid resistive loss during electric power transmission. The railway network may include storage and repair elements 35 for the shuttle units.

A selected number of shuttle units 22 in each consist 20 are electric powered as electrified mules or slugs and are controlled by an automated control system 34 as will be described in greater detail subsequently. Each electrified mule employs undercarriage trucks, comparable to those in current use on diesel-electric locomotives, which use reversible electric motor-generators as traction motors for carrying masses from the lower storage yard to the upper storage yard and as generators for dynamic braking while carrying masses from the upper storage yard to the lower storage yard. In this application the electric traction motor-generators which power the wheels are storing potential energy while raising masses uphill in motor mode and delivering energy via generation in dynamic braking mode while lowering masses downhill. For the exemplary embodiments described herein, the shuttle units employ standard railway bogies such as 3-axle radial bogies produced by Electro-Motive Diesel, Inc. as described in US Patent Publication US 2010/0011984 A1 published Jan. 21, 2010 entitled Self-Steering Radial Bogie. Each truck has multiple wheels to engage the steel rails of the ARES system railway network and is of conventional gauge for compatibility with common carrier rail lines.

Figure 2:
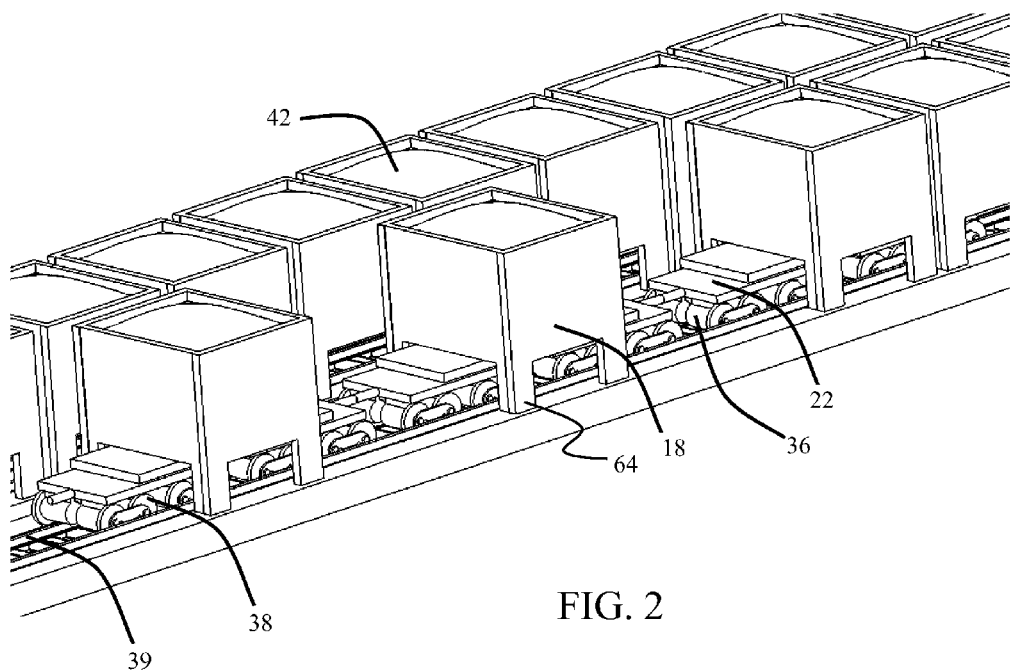
FIG. 2 is a perspective view of a first exemplary embodiment of operating consists with multiple shuttle units and storage masses employable in an energy storage system as disclosed in FIG. 1.

The embodiments disclosed in FIG. 1 and FIG. 2 show shuttle units 22 with bogies 36 each having multiple wheels 38 riding on rails 39 in the railway network. Each shuttle unit incorporates a support structure, described in greater detail subsequently, to carry masses 18 that may be made of concrete (such as reinforced and/or post tensioned concrete or of reinforced and/or post tensioned heavy concrete made from ore material such as taconite) or of any other sufficiently rigid and strong material such as high-strength plastic, metal, wood and the like. The masses can be solids fabricated from the base material such as reinforced concrete or hollow and filled with burden 42 such as dirt, rock, water, wetted sand, wetted gravel, wetted basalt, iron ore or any other sufficiently dense material preferably produced during on-site excavation. For an exemplary embodiment, each mass is a reinforced concrete container constructed of pre-cast, post-tensioned or reinforced concrete panels having an outer dimension 17' in height by 17' in width by 19.5' in length. The side walls and base of the masses are 18" thick, creating a total volume of 5,636 cubic feet. With burden at approximately 150 lbs per cu ft and similar density of the container materials, total weight for each mass may approach 424 tons. Each mass may be equipped with a manifold of tubes to enable the enclosed material to be liquefied by water or air injection allowing their bedding contents to be easily removed and replaced in the event of the need to adjust mass weight or center of gravity or in the event wetting of the storage medium were desirable to trim the mass density.

Figure 3:
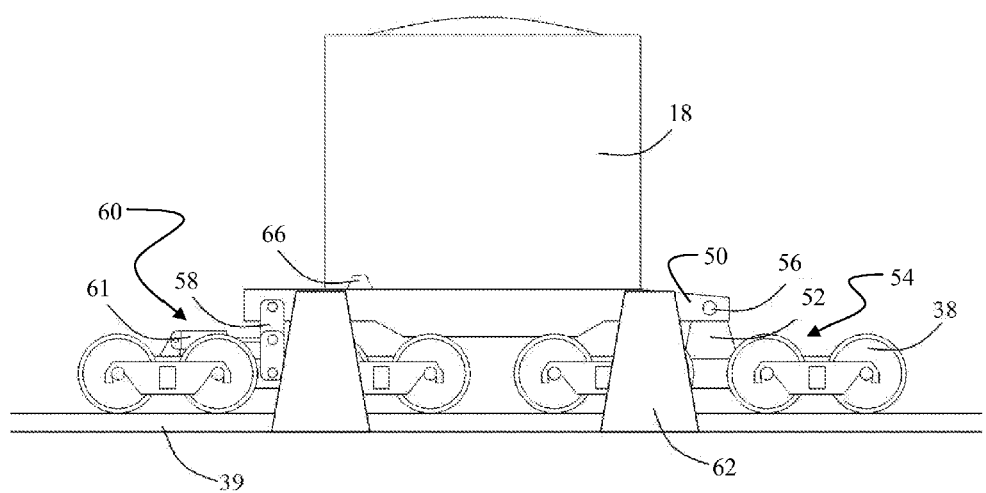
FIG. 3 is a side view of one shuttle unit of the first embodiment having engaged and elevated a mass for transport.
Figure 4:
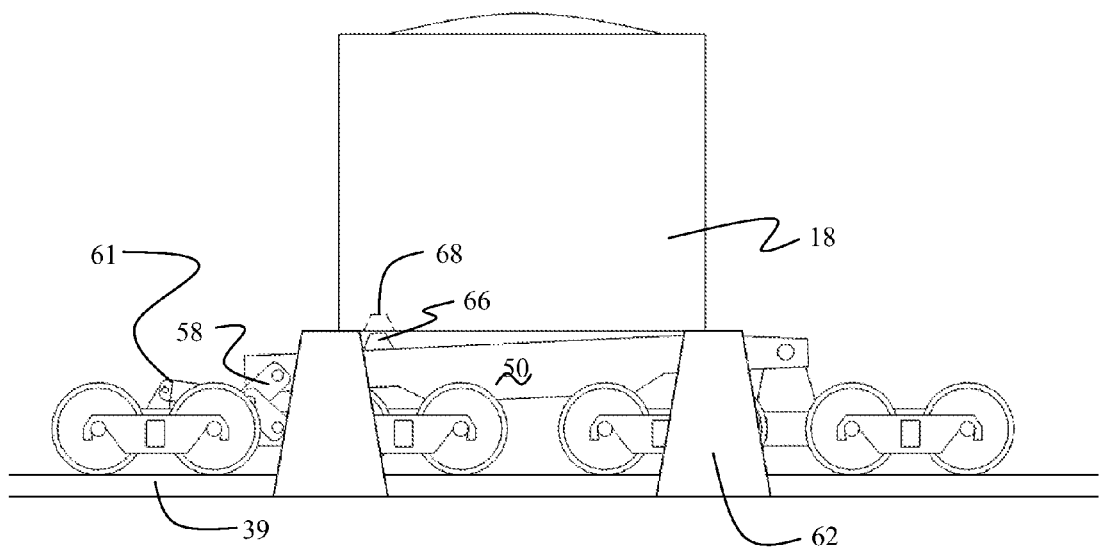
FIG. 4 is a side view of the shuttle unit of FIG. 3 in position to engage a mass for transport.

The shuttle units 22 are low in profile so that they can roll beneath the filled masses which are stored in the upper and lower storage yards suspended over storage yard tracks as will be described in greater detail subsequently. As shown in FIGS. 3 and 4, a storage transfer mechanism for the first embodiment incorporates a lever base 50 mounted at a first end to a stanchion 52 extending from a first bogie 54 of shuttle unit 22 with a pivot pin 56. A collapsible hinge 58 attaches the lever base proximate a second end to a second bogie 60 of the shuttle unit. In the collapsed position of the lever base 50 shown in FIG. 4, the shuttle unit 22 may roll freely under the mass 18. Extending collapsible hinge 58 with hydraulic ram 61 to lift the lever base 50 as shown in FIG. 3 lifts the masses off of their resting piers 62 shown in FIGS. 3 and 4 or off integral leg supports 64 as shown in FIG. 2. This operation is reversibly repeated in the upper and lower storage yards for loading and unloading the masses. For the embodiment shown, the lever base is arcuate in shape to allow clearance of the first end at the pin/stanchion mount in the lowered position. Pre-stressing of the beam structure of the lever base with associated straightening of the lever base due to imposed stress upon lifting of the mass provides the required arcuate shape in the unloaded collapsed condition. An engagement pin 66 on the lever base is received in a mating relief 68 in the mass 18 for securing the mass against movement on the lever base upon extension of the collapsible hinge.

For the embodiment of FIGS. 3 and 4, piers 62 are positioned to accommodate support of four rectangular masses with each mass supported at one corner on an associated pier. In alternative embodiments, K-rails or similar upstanding support elements may be employed reducing the alignment tolerance requirements. In the self standing leg embodiment disclosed in FIG. 2, having ground level support for the masses allows access to the rails 39 of the storage tracks 65 in the storage yards for maintenance. Similarly, use of K-rails, movable support piers or similar movable support structures allows maintenance access.

By having the shuttle units able to roll beneath the masses it becomes possible to pick up and deposit individual masses in sequence with precision in the storage yards. This allows the ARES system to park individual masses closely together in the storage yards greatly reducing the length of electrified rail system required for storage purposes. This feature also allows the individual masses to have greater spacing onboard the electric shuttle units thereby allowing multiple wheel bogies per mass in motion; thus creating the capability for the overall transport of heavier masses which require less storage track. As such the energy storage density and economic viability of the overall system is greatly improved.

Figure 5:
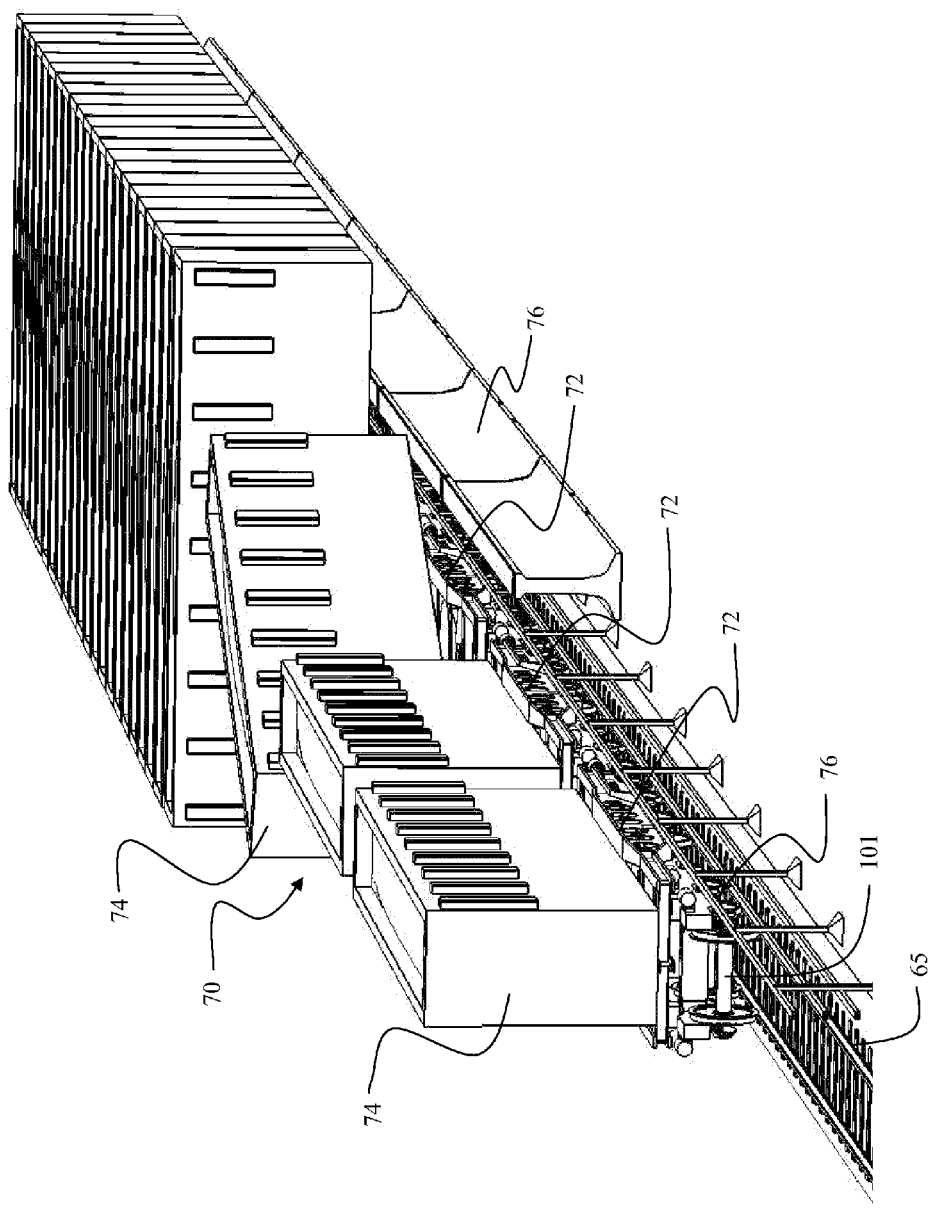
FIG. 5 is a perspective view of operating consists with a second exemplary embodiment of shuttle units and storage masses.
Figure 6:
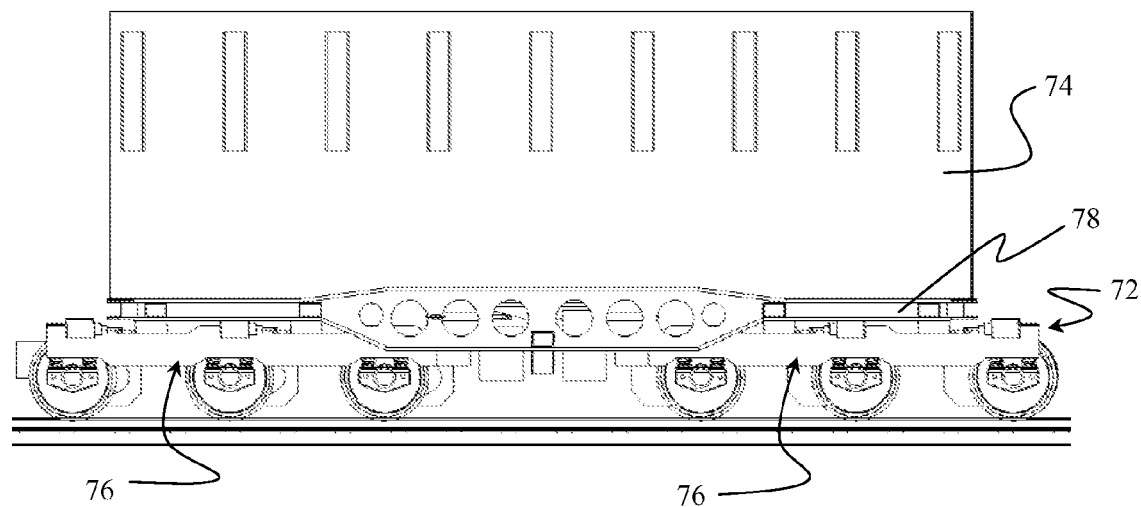
FIG. 6 is side view of one shuttle unit of the second embodiment with a mass in transport position.
Figure 7A:
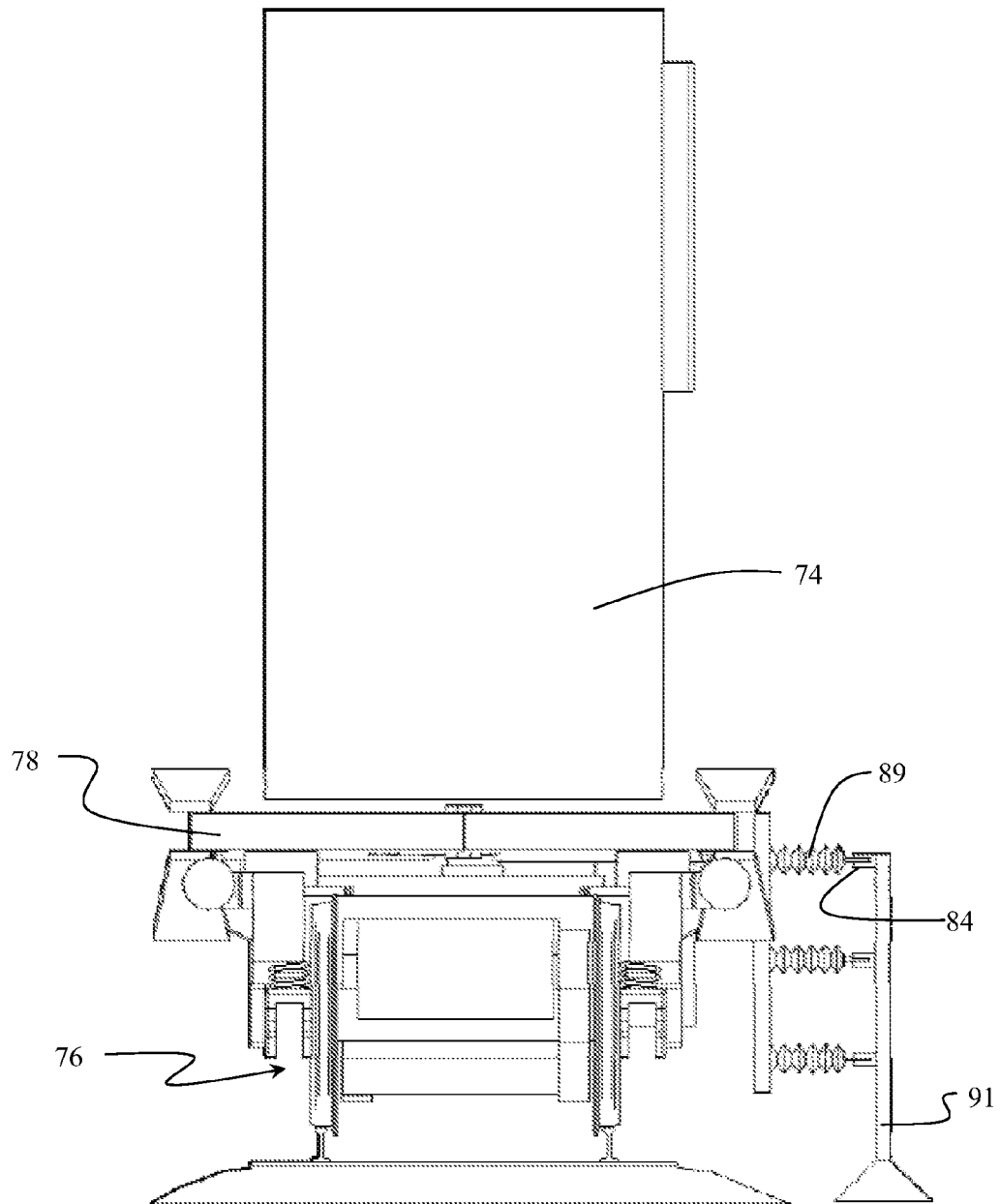
FIG. 7A is an end view of the shuttle unit of FIG. 6.
Figure 8:
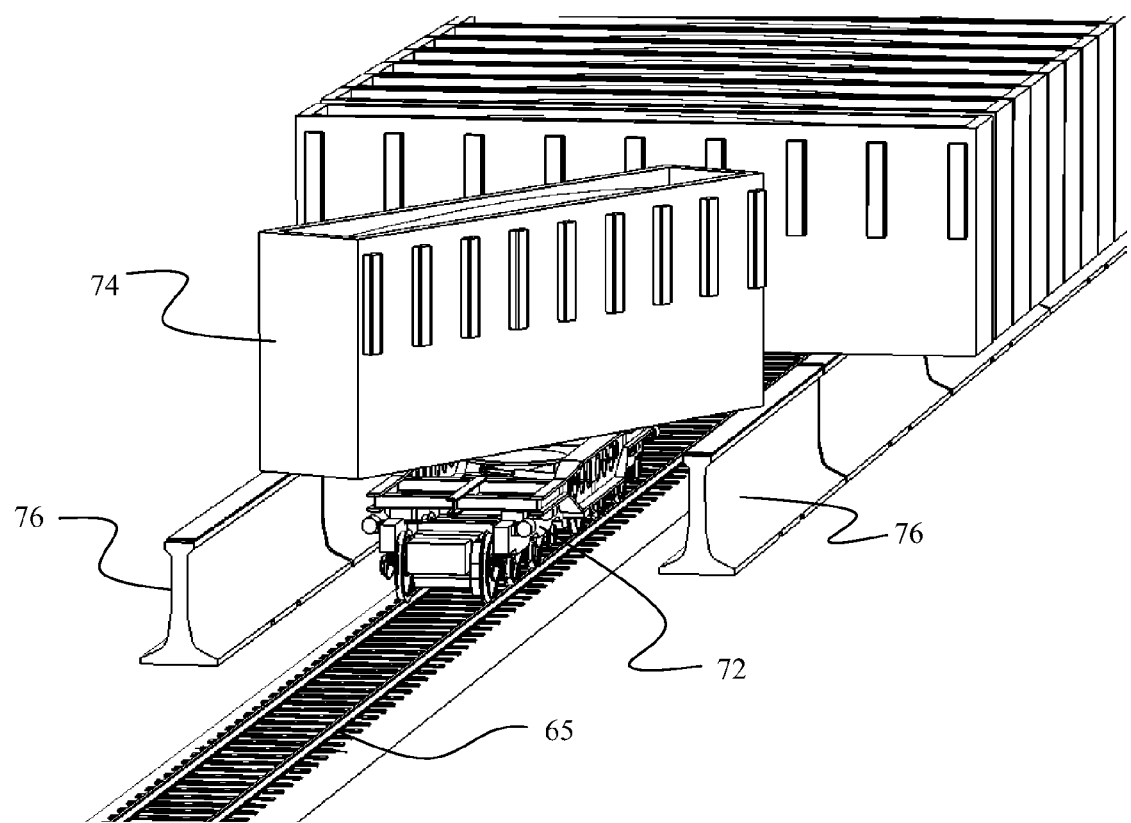
FIG. 8 is a perspective view of one shuttle unit of the second embodiment with the mass in rotational transition for storage.
Figure 9:
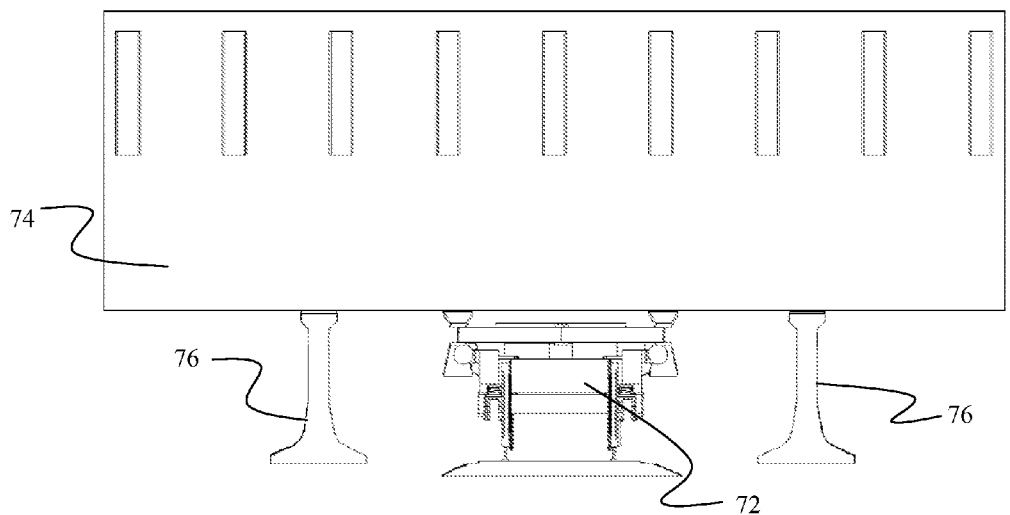
FIG. 9 is an end view of a shuttle of the second embodiment with the mass rotated for storage.

A second embodiment for the consists employs shuttle units and carried masses as shown in FIG. 5. In this embodiment each consist 70 incorporates four shuttle units 72. In this exemplary embodiment, two of the shuttle units in the consist are powered mules, as will be described in greater detail subsequently, and two shuttle units are unpowered. Masses 74 are rectangular in horizontal section allowing a foot print of the mass to be peripherally supported by the structure of the shuttle unit as will be described in greater detail subsequently. As shown in FIGS. 6 and 7A, each mass 74 is carried longitudinally on the shuttle unit 72 for transport within the railway network. Each shuttle unit, for the embodiment shown, employs two 3-axle radial bogies 76 carrying a support structure 78. This allows for an acceptable weight loading of approximately 50 tons per axle. Each shuttle unit incorporates a storage transfer mechanism described in greater detail subsequently, which allows a mass 74 to be lifted and rotated to a lateral or transverse orientation as shown in FIG. 8. When fully rotated as shown in FIG. 9, the mass is perpendicular to the storage track 65 and is lowered by the transfer mechanism to be supported on piers or support rails 76. As described with respect to the prior embodiment, movable K-rails employed as the support rails for mass storage allows unencumbered access to the storage yard tracks for easy maintenance. K-rails are commonly used as traffic barriers. For the embodiments shown, the K-rails in section are approximately 6' wide at their base narrowing to 2' at top width. The top surface of each support rail is a layer of reinforced rubber cushioning. The support rails are bedded trackside in crushed rock primary ballast.

As with the first embodiment, the potential energy in an exemplary large-scale ARES system described above is stored in approximately 14,000 masses, each weighing approximately 240 tons, each mass is a reinforced concrete container constructed of pre-cast, post-tensioned or reinforced concrete panels having an outer dimension 13' in height by 39' in width by 6.6' in (track) length. The side walls and base of the masses will be approximately 18" thick, creating a total mass volume of 3,350 cubic feet. The volume of each mass will be filled with heavy rock such as basalt bedded in sand, preferably produced during on-site excavation, depending on specific locations this mixture of material will provide a weight of approximately 143 pounds per cubic foot. The weight of the concrete container structure is also approximately 143 pounds per cubic foot. The masses are stored perpendicular to the storage tracks on movable reinforced concrete support rails, which parallel the tracks in the storage yard minimizing space demands and facilitating rapid loading onto shuttle units as previously described. Each mass may be equipped with a manifold of tubes to enable the enclosed material to be liquefied by water or air injection allowing their bedding contents to be easily removed and replaced in the event of the need to adjust mass weight or center of gravity or in the event wetting of the storage medium were desirable to trim the mass density. In an alternate embodiment the masses are constructed of interlocking layers of material allowing for crane removal or delivery of masses in layers or sections. The highly rectangular aspect of these masses which allows for their perpendicular storage over the storage tracks greatly reduces the miles of storage track required for an ARES system of a given capacity and when loaded and in motion provides for a significant reduction of the polar moment of inertia of the shuttle units improving reliability and reducing wheel wear. The rectangular masses of the second embodiment may be sized to conform with AREMA (American Railway Engineering and Maintenance-of-Way Association) dimensions for limited interchange service freight, allowing for the shipment by rail of empty mass containers for use at ARES facilities.

Figure 10A:
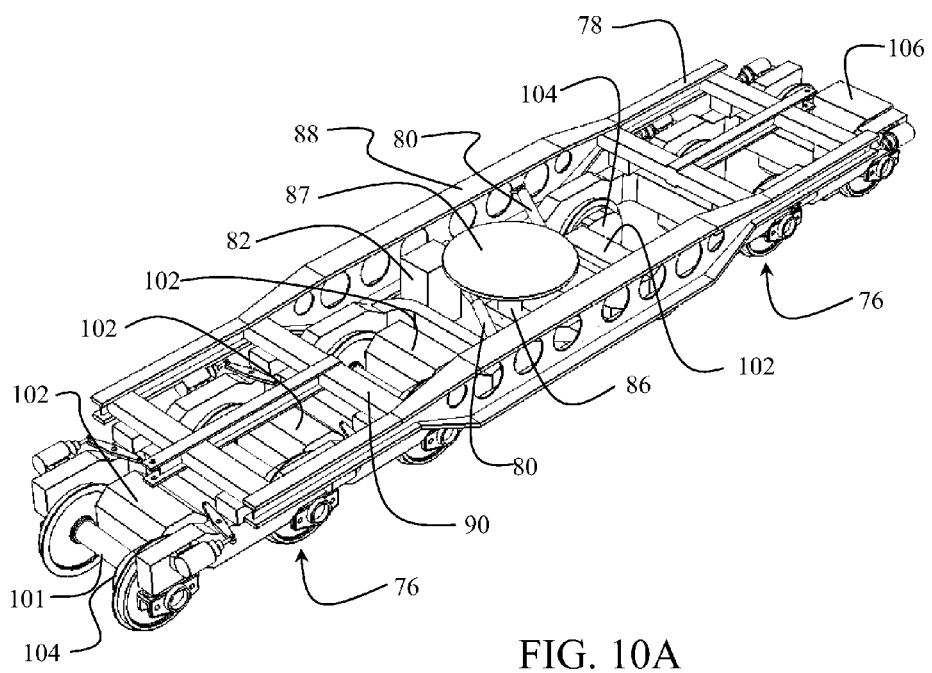
FIG. 10A is a detailed isometric view of the rotational support system for mass handling on the shuttle as defined in FIG. 6.

Returning to FIG. 5 with additional reference to FIG. 10A, each shuttle unit 72 in a 4-shuttle unit consist 70 is equipped with a transfer mechanism employing multiple hydraulic rams 80 actuated by a servo solenoid, or other conventional control device, and powered by a hydraulic pump 82 on board the consist. The hydraulic pump draws its power from the third rail. The transfer mechanism also includes a hydraulic lift 86 incorporating a rotating engagement table 87, on which the masses rest, positioned in the middle of the shuttle unit supported by longitudinal structural elements 88 and transverse structural elements 90 incorporated in support structure 78, sized as required to accommodate the weight of the masses and any generated tipping moments during operation.

When the consist is positioned to pick up a first mass, the lift actuates and the engagement table is lifted and the mass is raised off the support rails to a clearance height. The consist then moves away from the stored masses until a second mass is positioned over the second shuttle unit for pickup. While the second mass is being lifted, the first mass and engagement table is rotated by hydraulic rams 80 until the mass is parallel to the track. The mass is then lowered onto the support structure 78 above the two bogies of the shuttle unit. This operation is repeated for loading of masses on the third and fourth shuttle units of the consist. The consist is then ready for dispatch onto a power rail.

Off-loading of masses at the arriving storage yard is accomplished by reversing the described process. The consist enters the storage track and an end mass is lifted and rotated from the longitudinal position to the transverse position for reduced spacing placement on the storage support K-rails. As the consist moves forward to place the first mass, the adjacent mass in the consist is then lifted, rotated, then lowered in sequence onto the support rails. This step is repeated for the third and fourth masses on the consist which then passes beneath the row of stored masses and is then released to transition onto the return track to the originating storage yard.

Figure 11A:
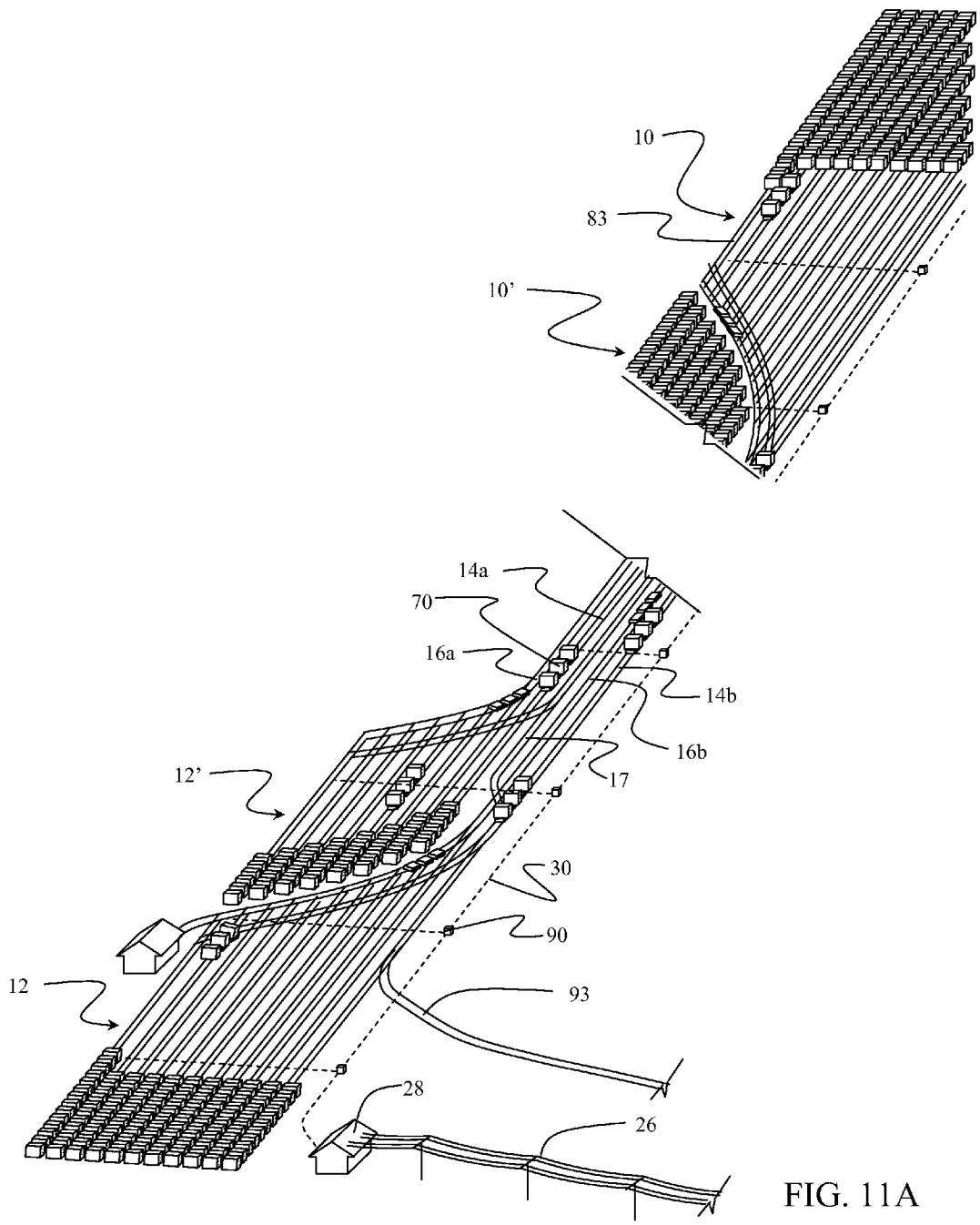
FIG. 11A is a pictorial view of an exemplary multi-track power and return layout employed in an embodiment of the energy storage system.

FIG. 11A shows details of an exemplary implementation of the beginning track sections of a power and return track system. The specific elements of each ARES system facility will vary with its intended storage and generation capacity, the elevation difference between the upper and lower yards and the grade. An ARES facility with a 3,600-foot elevation difference between upper and lower storage yards and an average inter-yard grade of 7.5% will be able to charge or discharge at 1,000 MW while providing 8000 MWh of net energy storage. Such and exemplary embodiment could incorporate the following fixed elements.

Five parallel electrified main tracks consisting of two power tracks 14a and 14b, two return tracks, 16a and 16b and one standby track 17 able to operate in either mode; each main track approximately 8.1 miles in length connecting between an upper and lower storage yard. In alternative embodiments, additional power and return tracks may be employed for sizing of the ARES system to match power requirements. In an embodiment employing four power tracks and two return tracks, the main tracks provide a capacity for 203 or more consists to be in continuous operation charging or discharging and returning. The consist operating speed on a power track is approximately 35 mph with the onboard power system for the electrified shuttle units in synchronous operation as will be described subsequently, but may be controlled at a desired alternate speed for variation in power input or output. The synchronous control speed allows direct connection of the traction motor/generators on the shuttle units to the AC trackside system with significant efficiency savings. The empty consist speed on the return track is a function of the total number of consists in the system; however an approximate returning speed would be 60-70 mph. In this configuration, approximately fourteen percent of the total power track length is occupied by moving consists, which are spaced approximately 1,300 feet apart in-motion when four tracks are employed for charge/discharge and two for returning consists. The combined length of the six operational tracks between the upper and lower storage yards is 48.6 miles. The standby track may substitute as either a power track or a return track as necessary to permit system maintenance and enhance operational reliability. The power, return and standby tracks are all fully capable of acting in either capacity and may be substituted for one another allowing for rotation during routine track maintenance and even distribution of track wear.

Figure 11B:
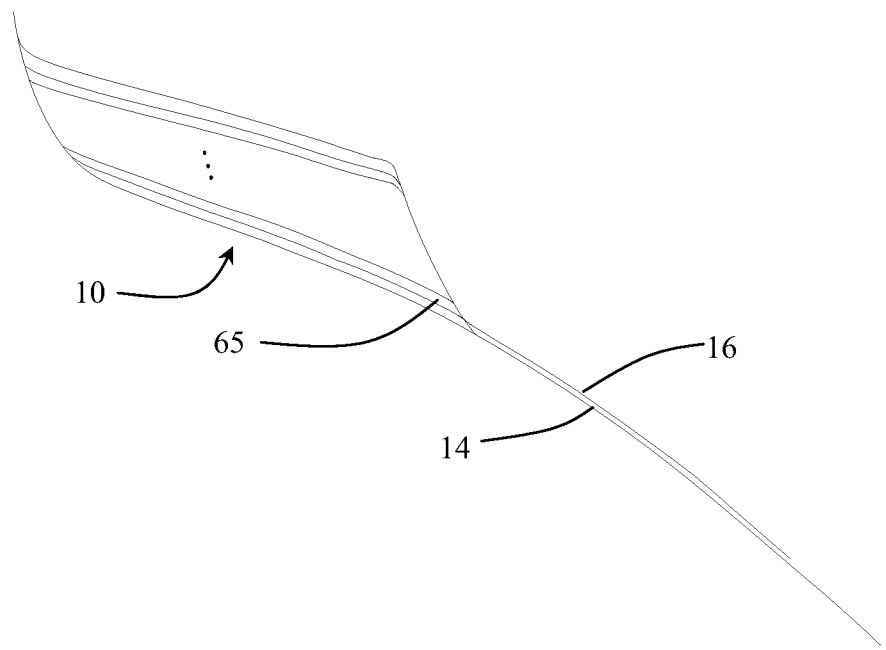
FIG. 11B is an exemplary upper storage yard layout for the energy storage system.
Figure 11C:
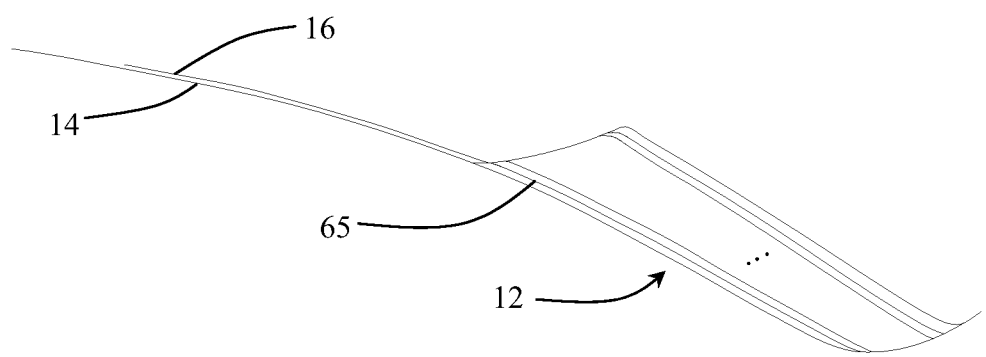
FIG. 11C is an exemplary lower storage yard layout.

An upper storage yard 10 and lower storage yard 12 are shown in FIGS. 11B and 11C, for an exemplary embodiment each incorporating approximately sixteen 1.2 mile long storage tracks 65. Each storage yard is approximately 1.7 miles long and 800' in width; the extra length allowing the individual storage tracks to be staggered into a trapezoidal footprint allowing for switching at the beginning and end of each track. Multiple interconnecting lines and switches are configured to enable a loaded consist proceeding out a storage yard to be started onto one of the main tracks every 7.4 seconds with spacing between consists as indicated above. Multiple insulated power supply rails 84, as previously described, provide trackside AC power for mule shuttle units in the consists operating on the main tracks, standby track and storage yard tracks. These power supply rails are connected at appropriate intervals to a trackside 2,300V AC distribution system that transmits power into or out of the consists during operation in the storage yards and while in generation or discharge on the main tracks. FIG. 7A shows an exemplary configuration for the power supply rails 84 and associated contactors 89 mounted to the structure of the powered mules in the consist. For the embodiment shown, an upstanding support 91 carrying the supply rails in a 3-phase arrangement is shown. In an alternate embodiment trackside power is supplied into and out of the shuttle units via 3 kV DC power supply rails with appropriate AC power conversion onboard the shuttle units.

Additional storage tracks may be included as deemed appropriate to provide backup consists with rapid access to a storage yard for immediate deployment in case of breakdowns. Additional masses as deemed appropriate may be provided to be held in reserve. The reserve shuttle units and reserve masses may be stored on the same backup siding(s). A spur track 93 (shown in FIG. 11A) is included to provide access from the ARES facility to a common carrier rail line (to facilitate original construction, delivery of shuttle units and of maintenance and repair items). The shuttle units, are interchangeable among ARES facilities at different locations in order to cost effectively accommodate periods of peak regional storage demand. Standard gauge bogies for the shuttle units allows transportation over the commercial railway network to any desired location.

Figure 11D:
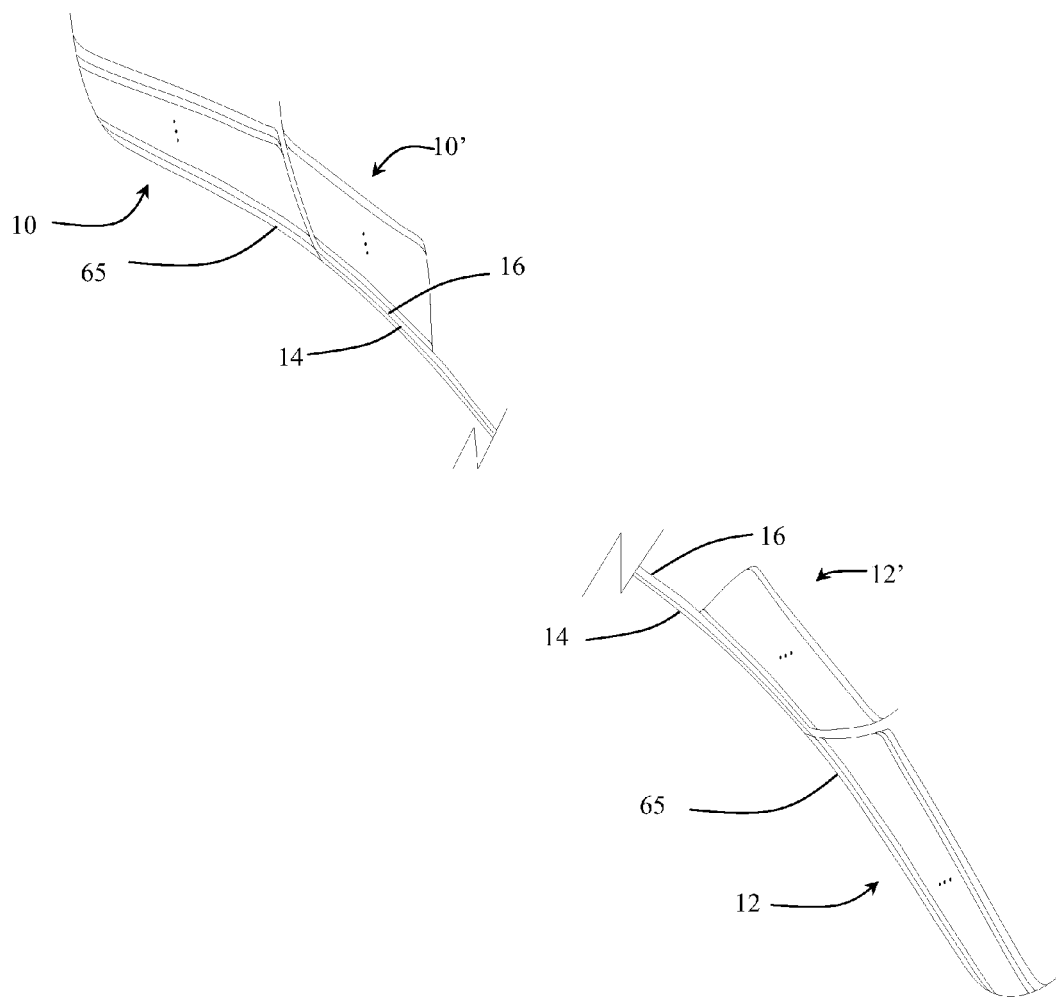
FIG. 11D is an exemplary layout for supplemental upper and lower storage yard expansion.

FIG. 11D shows supplementary upper and lower storage yards 10' and 12' which are nested within the upper and lower yards 10 and 12. This configuration allows the addition of greater storage capability while maintaining easy switch access to the power, return and standby tracks in the railway system.

For the embodiments shown, all tracks in the ARES system facility, including the storage yard track are electrified with parallel power supply rails providing continuous AC electric supply to the shuttle units. The tracks are heavy (136 lb./yard) head-hardened standard gauge rail. The track is laid on a reinforced heavy capacity roadbed with direct track fixation to reinforced concrete anchors spaced at approximately 620' intervals, for the exemplary embodiment shown, to prevent down-slope track-creep. The roadbed matrix is comprised of a multiple sub-ballast layers, typically a rock primary ballast with a hot-mix asphalt underlayment. The storage yards contain multiple parallel storage tracks so time allowance for the dispatch of each Mass is not limited by the time required for a single row of shuttle units to position and engage their respective loads.

Figure 12:
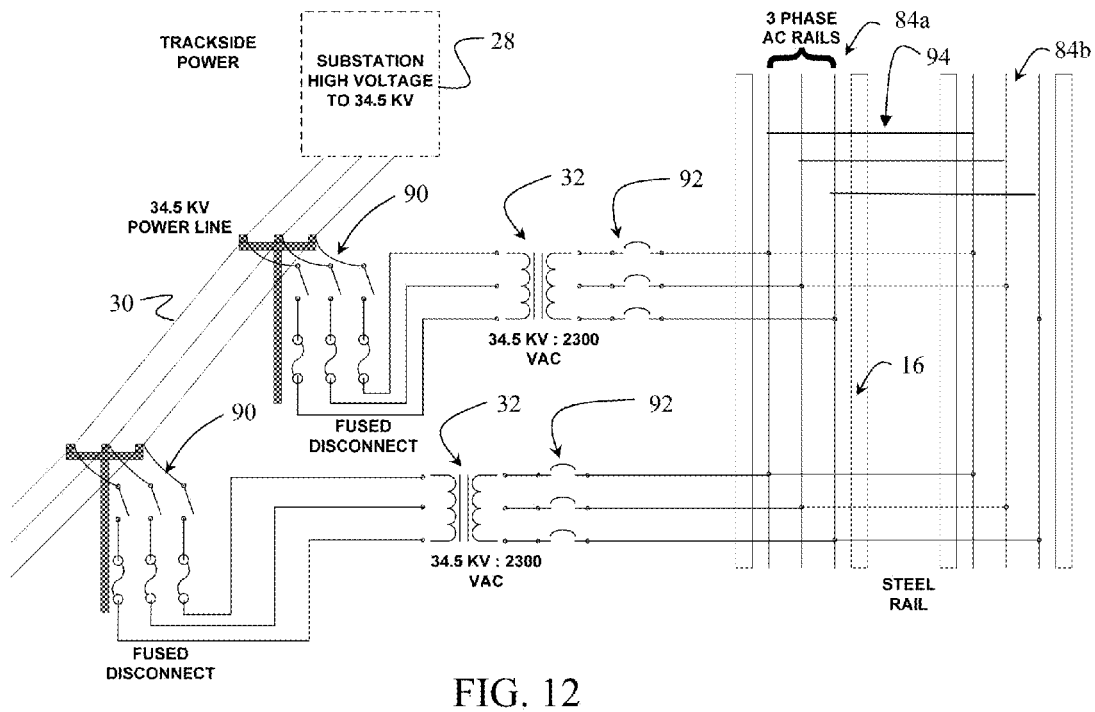
FIG. 12 is a trackside power schematic for an embodiment of the system.

FIG. 12 demonstrates a trackside power system for the present embodiment. As previously described with respect to FIG. 1, a substation 28 attached to high voltage power lines transforms available power to 34.5 KV. Trackside electrical distribution lines 30 distribute or return power along the tracks in the system represented as a power track 14 and return track 16 in FIG. 12. Fused disconnects 90 connect the electrical distribution lines to transformers 32 for voltage adjustment between 34.5 KV and 2300 VAC operational voltage. Circuit breakers 92 connect 3-phase power supply rails 84a or 84b associated with each track for interconnection to the contactors on electrified mules in the consists. For increased efficiency, power derived from braking regeneration on either a power track or a return track is provided through a direct connection with interconnects 94 between track power supply rails for use in providing preferred power to consists traveling uphill avoiding associated substation and on-site transformer and transmission losses.

In broad embodiment, the present invention is a highly efficient and low cost potential energy storage system. The rate of input and output can be varied considerably by controlling the speed and or quantity of the electric powered shuttle units in motion. Standard friction brakes can be used to park the electric powered shuttle units and to stop them in case of a failure.

A computer or computers housed in the automated control system 34 running supervisory control and data acquisition (SCADA) software will be used to control the energy storage system operation. Following is a description of computer sensors, actuators and an exemplary algorithm that can be used to control an ARES system as described for the exemplary embodiments. This is only one example of computer sensors, actuators and process and the energy storage system operation is not limited to these computer sensors, actuators and process.

The ARES system operates in a predetermined manner dependent on such factors as requirements for storing or releasing energy, the rate of power being stored or released, the range of ancillary services the system is providing to the grid, the weather conditions, and others. It uses sensors that include but are not limited to individual consist position, velocity, acceleration, mass position, wheel speed and slip, electric component amperage draw, electric component voltage, electric component temperature, mechanical component temperature, rail switch position and others. These sensors and communications components can be hard wired or wireless with various communications systems and protocols. The control system may use controllers that include but are not limited to individual consist friction brakes, track switch motion, electric and electronic switches, consist mass lifting mechanisms and others. These controllers can be electromechanical, pneumatic or hydraulic.

Figure 7B:
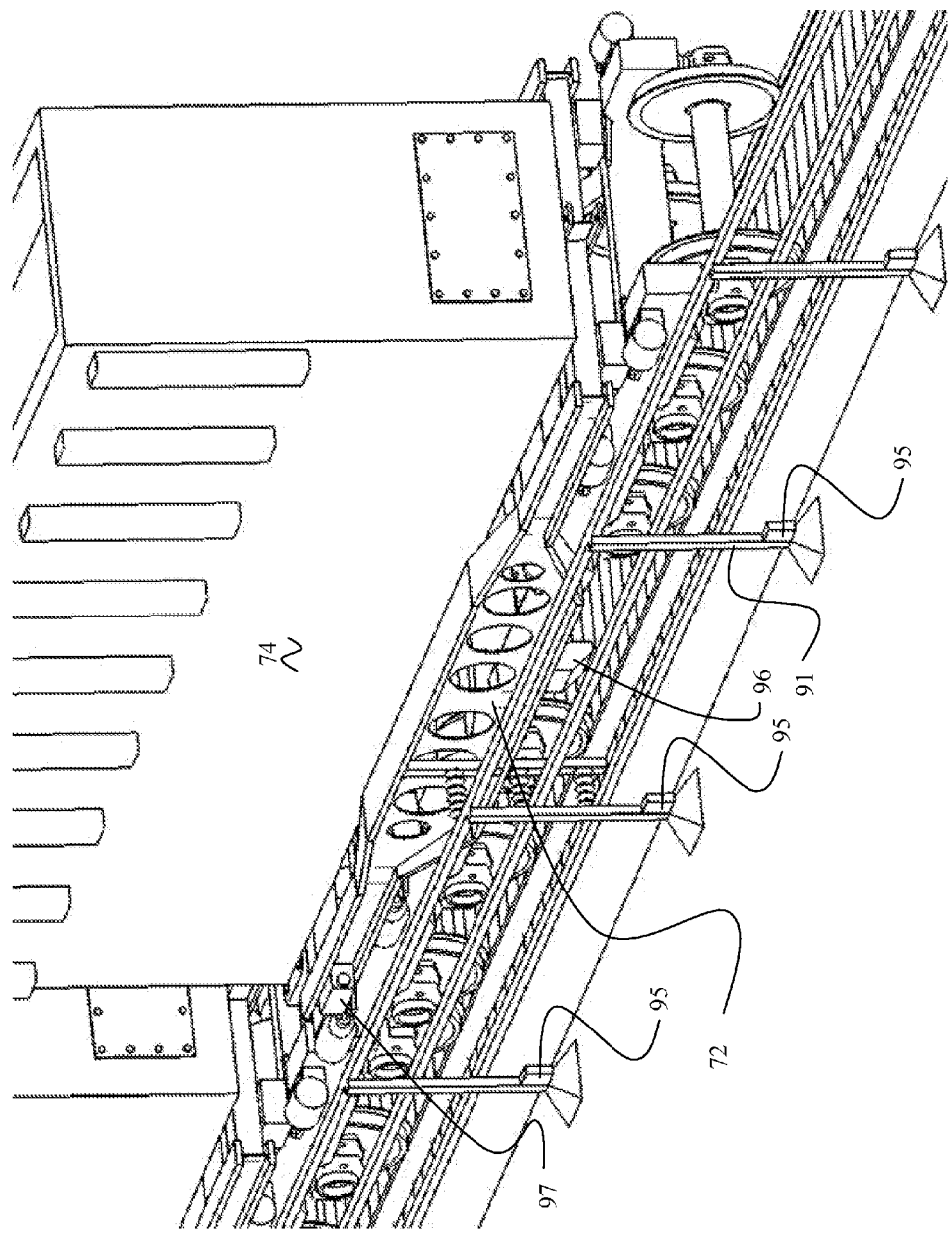
FIG. 7B is a partial perspective side view of the shuttle unit and trackside components.

Trackside location tags 95 placed every 50 feet alongside the main tracks, as shown in FIG. 7B (attached as exemplary to the stanchions for the power supply rails, will signal to sensors 96 on the consists reporting on the location and speed of each consist. Using this information, the SCADA system will control the motion of all shuttle units in motion. In the storage yards, the location tags will be located at much closer spacing to help position the consists for mass pickup. Location tags may also be placed on the masses themselves for final pickup positioning. Differential GPS transponders 97 on the consists, as a backup to the location sensors/location tags, can also transmit all shuttle unit locations to a real time display in the control center. An on-site differential GPS transmitter on or near the ARES facility will be employed to enhance the accuracy of the shuttle unit data received at the control center. Additional sensors on each consist will monitor and control rectifier/inverter function, backup battery status, motor generator status, lift mechanism function, brake function, track condition, and hydraulic fluid output under control of the SCADA system. For an exemplary embodiment, a multiplex telemetry system operates through the rails capable of delivering unique commands to each consist with a backup communication system routed to the location sensors.

The process of starting, operating and stopping the energy storage system can be a pre planned set of steps that the components go through. There can also be pre planned steps for changing the power in or output, removing a consist from the process for repair and others. Each step in the process can be accomplished by a single or multiple sensors and or actuators. Additionally, each consist may be programmed to act as a member of an ad hoc meshed network system in which the consist responds to the operational requirements being received from a control center in a pre programmed manner relative to its position relative to other consists and switch settings. An example of operational flow is shown in FIGS. 13A-D.

Excess grid power is detected, in step 1302 and the ARES system is engaged to store energy. Using an exemplary system with the second described embodiment and fictitious consist numbering, mass numbering and storage locations for reference purposes, consist #178 connects to the grid and is moved to a position under mass #1584 at location 4L-128 (storage track 4 lower yard storage position 128), step 1304. The consist is loaded in step 1306; the transfer mechanism on first shuttle of consist #178 is extended to engage mass #1584, the consist is moved one position and the transfer mechanism on second shuttle is extended to engage mass #1585, the consist is moved one position and transfer mechanism on third shuttle is extended to engage mass #1586, the consist is moved one position and transfer mechanism on fourth shuttle is extended to engage mass #1587. Rail switch #L47 switches storage track #4 for uphill right of way onto a selected power track in step 1308. This loading process is sequentially repeated. For example consist #179 then moves to a position under mass #1588 at location 4L-132 (track 4 lower yard pylon position 132) and so on.

Consist #178 proceeds along storage track #4 onto uphill right of way and employs grid power, step 1310. On board control accelerates the consist to synchronous speed, step 1312, and then converts to direct synchronous operation, step 1314. The ARES system then monitors for trimming (regulation up/regulation down requirements from the utility or ISO), step 1316, and monitors for VAR requirements, step 1318. Rail switch U21 switches uphill right of way onto storage track #8 in the upper storage yard, step 1320. The on board control converts from direct synchronous operation to decelerate consist from synchronous speed, step 1322. Consist #178 positions mass #1584 at location 8U-275 (track 8 upper yard pylon position 275), step 1324, the consist then unloads the masses, step 1326; the transfer mechanism on first shuttle of consist #178 is extended to off load mass #1584 at location 8U-275, the consist is moved one position and transfer mechanism on second shuttle is extended to off load mass #1585, the consist is moved one position and transfer mechanism on third shuttle is extended to off load mass #1586, the consist is moved one position and transfer mechanism on fourth shuttle is extended to offload mass #1587. A determination is then made whether to store #178 at upper yard or return to lower yard for additional mass transportation, step 1328. If returned, rail switch U21 switches storage track #8 to downhill right of way on a selected return track, step 1330 and consist #178 descends from track #8 to lower yard, step 1332. If stored, switch U21 switches storage track #8 to upper storage yard siding, step 1333 and consist #178 transitions off track #8 to upper storage yard siding, step 1334. Depending on storage rail requirements, the consist may be stored in position under the masses. The steps are sequentially repeated for additional storage masses until power storage requirements communicated by the utility or ISO are completed.

When a power demand received from the utility or ISO, step 1336, switch U21 connects upper storage yard siding to upper storage track #8, and consist #178 connects to the grid step 1338, and is moved to a position under mass #1587 at location 8U-275 (track 8 upper yard pylon position 275) and loaded, step 1340. For loading the consist the transfer mechanism on first shuttle of consist #178 is extended to load mass #1587 at location 8U-275, the consist is moved one position and transfer mechanism on second shuttle is extended to load mass #1586, the consist is moved one position and transfer mechanism on third shuttle is extended to load mass #1585, the consist is moved one position and transfer mechanism on fourth shuttle is extended to load mass #1584. Rail switch #U21 switches track #8 for downhill right of way, step 1344. Consist #178 proceeds along track #8 onto downhill right of way and employs bogie generators for speed control transferring generated power to grid while reaching lower yard, step 1346. This operation is repeated sequentially for additional consists. Consist #177 moves to a position under mass #1583 at location 8U276 and so on.

On board control accelerates consist #178 to synchronous speed and then converts to direct synchronous operation, step 1348. The system then monitors for trimming (reg up/reg down requirements), step 1350 and monitors for VAR requirements, step 1352. Upon approaching the lower storage yard, rail switch L47 switches downhill right of way onto lower storage track #4, step 1354. On board control converts from direct synchronous operation to decelerate consist from synchronous speed, step 1356. Consist #178 positions mass #1587 at location 4L-128, step 1358. The consist then offloads the masses step 1360; the transfer mechanism on first shuttle of consist #178 is extended to off load mass #1587 at location 4L128, the consist is moved one position and transfer mechanism on the second shuttle is extended to off load mass #1586, the consist is moved one position and transfer mechanism on the third shuttle is extended to off load mass #1585, the consist is moved one position and the transfer mechanism on fourth shuttle is extended to offload mass #1584. A determination is then made whether to store consist #178 at lower yard or return to upper yard for additional mass transportation, step 1362. If returned, rail switch U21 switches track #8 to uphill right of way on a selected return track, step 1364 and consist #178 ascends from storage track #8 to the upper yard, step 1366. If maintained in the lower storage yard, the consist position is either maintained or the storage track is switched to the siding, step 1368 and the consist is moved onto the siding, step 1370.

Returning to FIG. 10A, two of the shuttle units in each consist, each with two 3-axle radial bogies 76 providing a total of six axles 101, are powered by AC buried permanent magnet synchronous motor-generators 102 to generate enough tractive effort to brake the consist down hill. These synchronous motor-generators replace the asynchronous motor-generators currently used in the railroad industry. The remaining shuttle units are not powered by traction drive axles and are spaced alternately in-between mules in a consist to achieve maximum adhesion from loaded masses during loading and unloading. In alternative embodiments, the total number of powered axles and/or shuttle units may be varied depending on operational requirements.

The motor-generators' torque is transmitted to and from the drive axles via a mechanical gearbox 104 and the speed of the drive wheels is determined by the number of poles in the motor generator, the fixed gear ratio of the gearbox and the drive frequency of a traction control unit (TCU) 106 provided for each mule as will be described in greater detail subsequently.

Figure 10B:
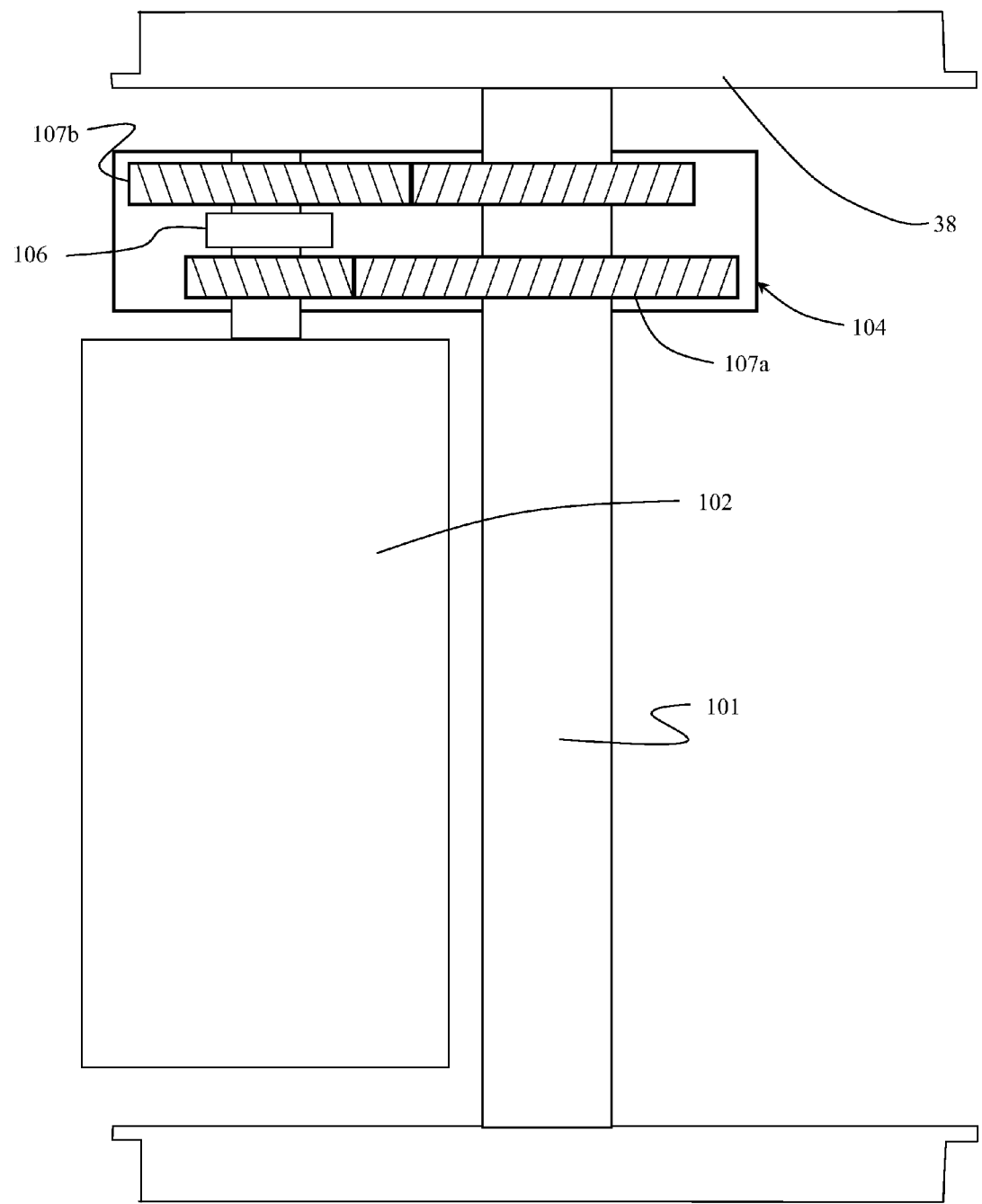
FIG. 10B is a cross section of an exemplary transmission for use with the drive axles.

As shown in FIG. 10B, operation of the consists synchronously with the trackside distribution system is enhanced by use of transmission elements in gearbox 104. A dog clutch 105 operating between gear trains 107a and 107b allows selection for a first synchronous speed for power track operation of the shuttle units in a loaded consist and a second synchronous speed for return operation of the consists in an unloaded state.

The speed of the consist is determined by the TCU which, in response to commands from the control center SCADA system, determines the frequency at which the synchronous motor/generators operate, and thus the speed of the shuttle units in the consist.

For the embodiment disclosed, the two shuttle units which are powered as electrified mules in a consist are each riding on two pairs of radial 3-axle diesel-electric locomotive bogies. This configuration allows each car six axles and provides for a loaded consist wheel loading of 50,000 lb (50 tons per axle). For an exemplary implementation of the described embodiments, each regenerative traction motor/generator for the described embodiment has a peak power capacity of 1.25 MW coupled to the axle with a reducing transmission gearbox as previously described. At 35 mph on a 7.5% grade each motor/generator-equipped axle will generate a net output to the grid (after system efficiency losses) of 0.74 MW from the potential energy of the masses carried by each consists in motion. The peak mule axle power requirement is based on the power of the mass of the consist in motion at 35 mph (12.5 MW) divided by the number of powered axles per consist (12) times a reserve power of 20% for acceleration/deceleration (1.2).

The net mule axle power to grid may be calculated as the power of the loaded consist in motion at 35 mph (12.5 MW) divided by the mass to consist weight ratio (1.26) divided by the number of powered axles per consist (12) times the one-way system efficiency loss (0.89); equaling 0.74 MW Each consist of the exemplary embodiment, which is a two mule plus two unpowered shuttle unit train providing 12 powered axles, will generate approximately 8.8 net megawatts power when synchronized directly into the grid at a speed of 35 mph on a 7.5% grade. Variations in grade within a particular ARES facility are accommodated by sizing the motor/generator unit and/or gear box on each axle to respond to the maximum slope output plus a reserve power component for acceleration or deceleration adequate for such slope. Variations in slope at different ARES sites may be accommodated by having more un-powered axles if the peak grade is shallower or increasing the number of powered axles if the slope is steeper. Alternately, variations in slope at different ARES sites may be accommodated by changing the ratio of mules to unpowered shuttle units in a consist; or by a combination of the two means.

Using the case of a 1,000 MW ARES facility at full-rated power there will be 1,326 axle mounted motor/generators onboard 227 mules in 114 mass loaded consists in motion on the six power tracks at a given time. The other 106 consists are either returning to the loaded storage yard to pick up their next load of masses or in process of sequencing their loading. Having the unloaded consists return for loading on the return tracks at approximately twice the loaded control speed (by a transmission gear ratio change in the current embodiment to allow synchronous return operation) on the power tracks greatly reduces system capital cost with minimal impact on efficiency.

Variations in grade on a given system may be accommodated by sizing the motor/generators to the power requirement for the steepest section of rail and reducing the number of engaged motor/generators on a given shuttle unit or consist so that the power requirement matches the potential energy of the track grade at a given point. This allows each consist to maintain a set grid-synchronization speed without loosing direct-synchronization. In effect throttling the consists by varying number of its on-line motor/generators to match the track grade rather than changing the control frequency of its motor/generators.

Figure 14:
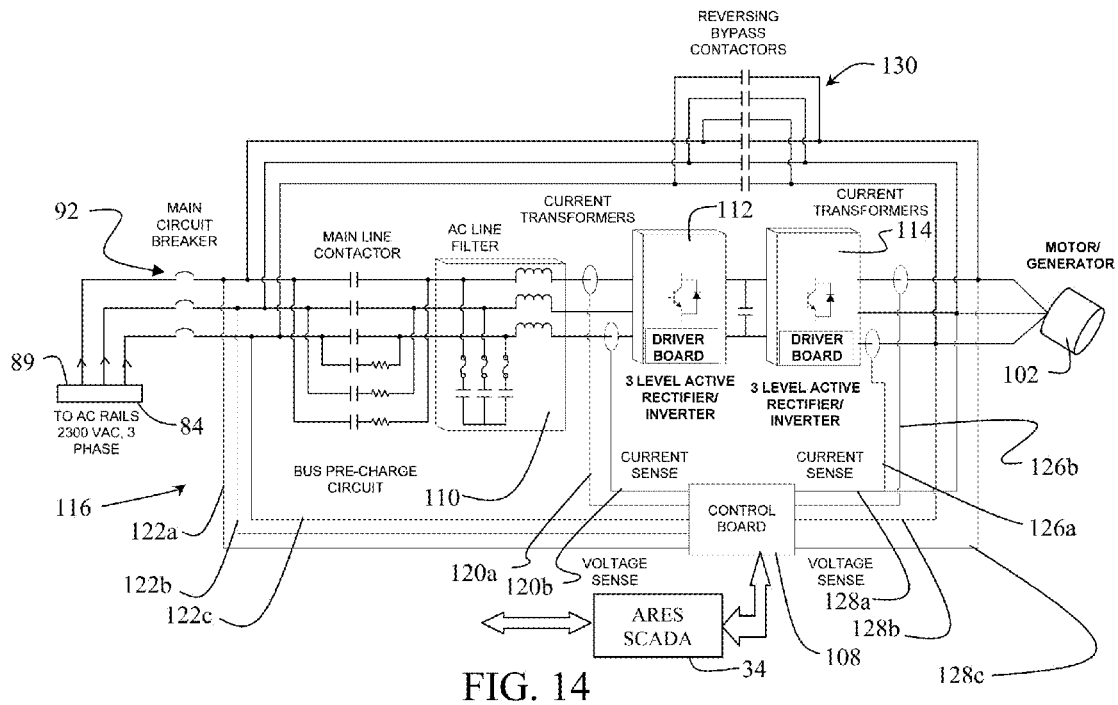
FIG. 14 is a shuttle unit power schematic for an embodiment of the system.
Figure 13A:
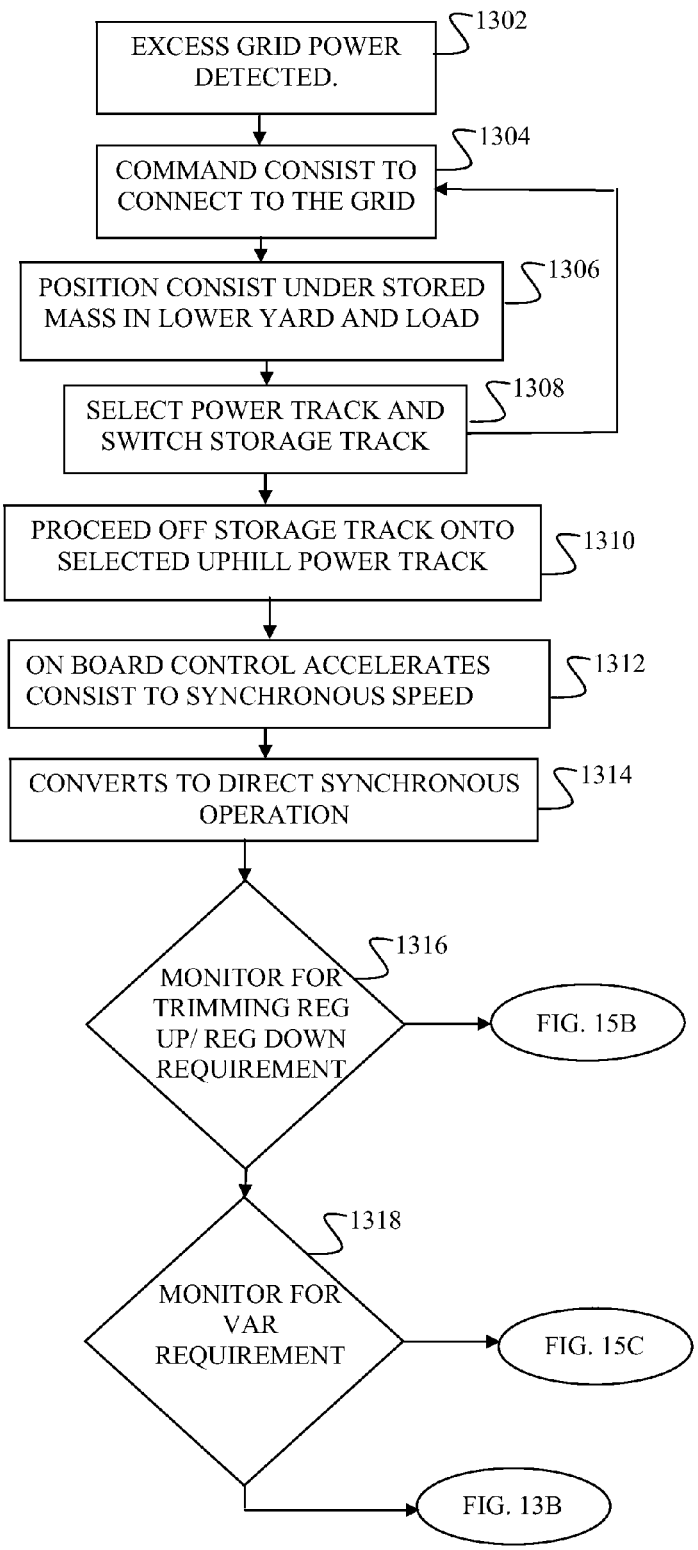
FIGS. 13A-D are a flow chart of an exemplary operational scenario for the disclosed embodiments of the energy storage system.
Figure 13B:
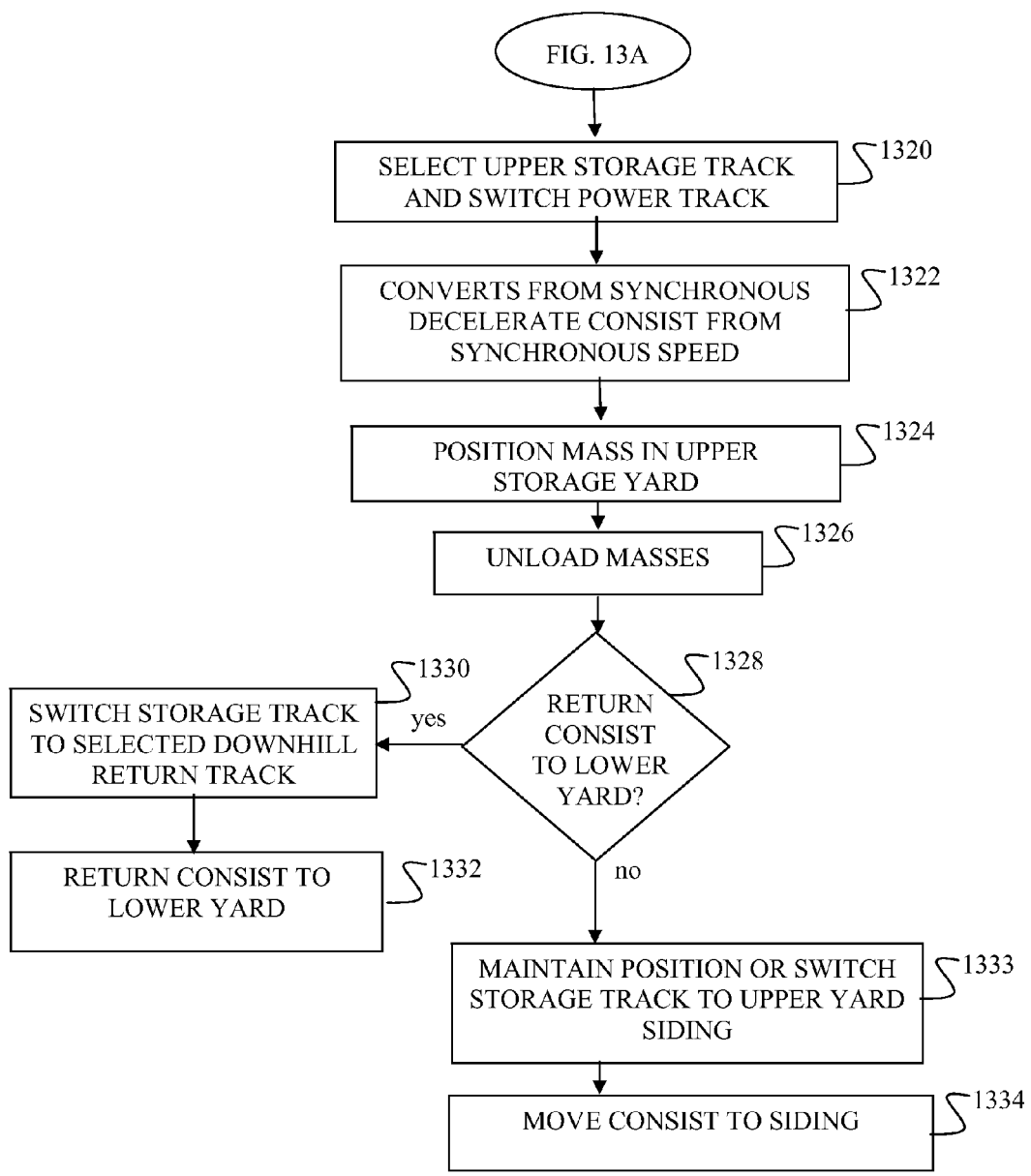
Figure 13C:
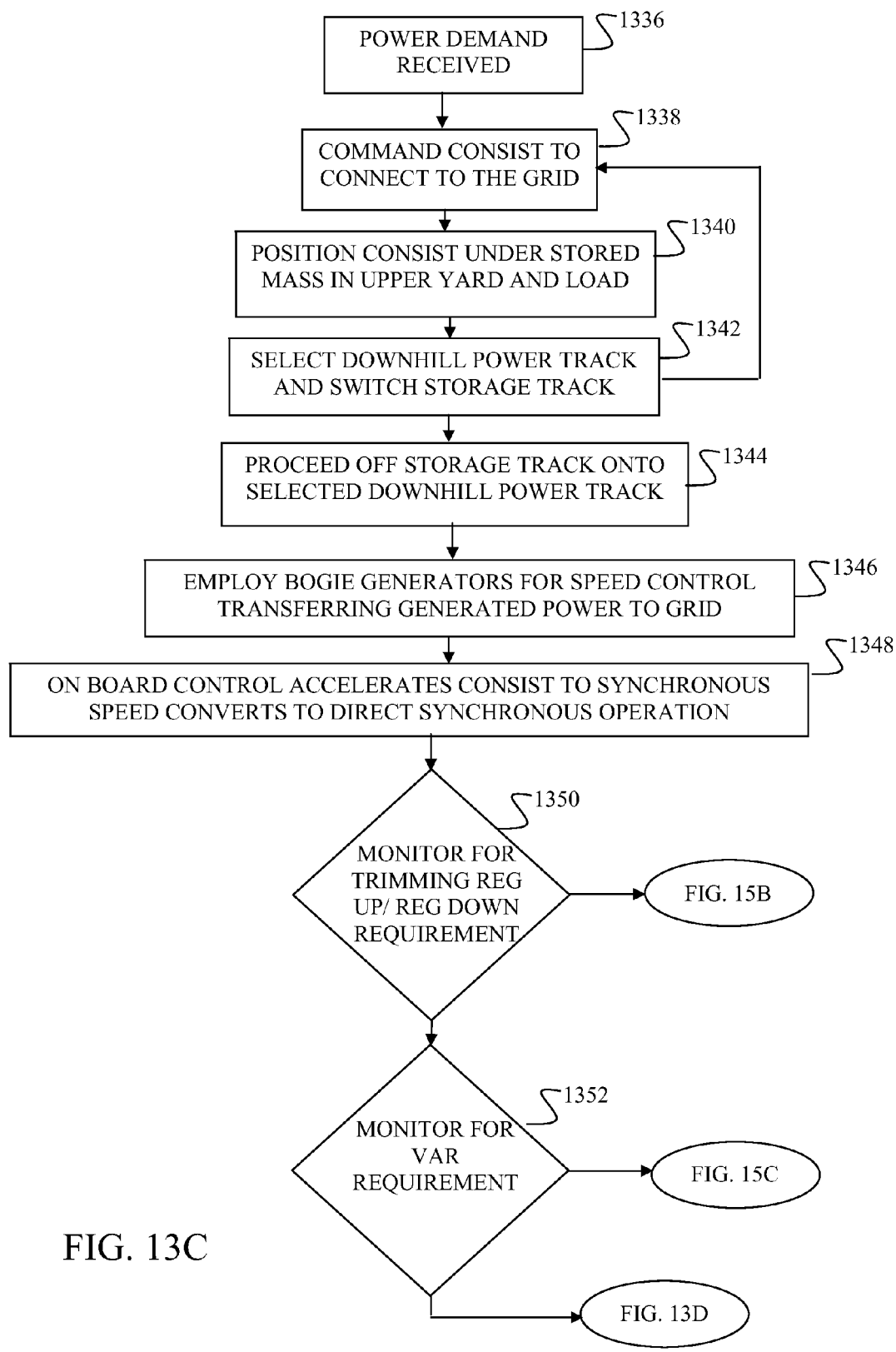
Figure 13D:
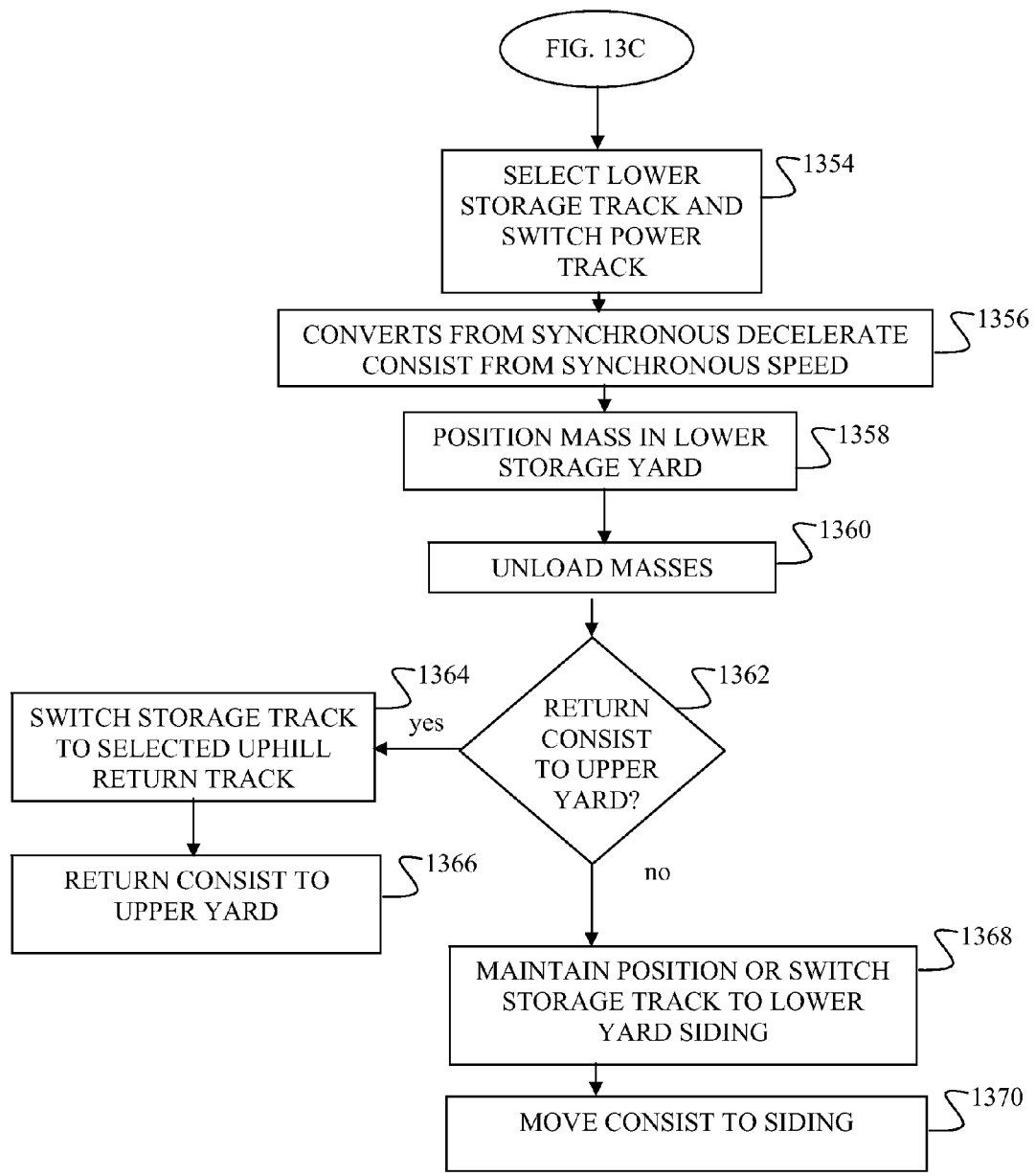

To provide the required operational characteristics in the powered shuttle units an onboard power system as shown in FIG. 14 is employed. The trackside power system (for the embodiments shown being 3-phase 2300 VAC) is connected to the electrified shuttle unit or mule through the spaced main circuit breakers 92 to power supply rails 84. Contactors 89 on the shuttle unit connect to the traction control unit (TCU) 106. Main line contactors 107 controlled by the TCU control board 108, described in greater detail subsequently, interconnect to the power supply rail contactors with power conditioning through an AC line filter 110 to a first utility side 3-level active rectifier/inverter 112. For the embodiments shown, an insulated gate bipolar transistor (IGBT) circuit is employed. A second generator side 3-level active rectifier/inverter 114 transfers power to (or from) the motor/generators 102. A bus pre-charge circuit 116 also commanded by the control board is provided. Current sensors 120a and 120b and voltage sensors 122a, 122b and 122c are employed by the control board for sensing and control of the trackside power system side of the rectifier inverters and current sensors 126a and 126b and voltage sensors 128a, 128b and 128c are employed by the control board for sensing and control of the motor/generator power. The control board provides acceleration, deceleration and trimming control of the motor/generators as will be described in greater detail subsequently.

Reversing bypass contactors 130 are provided for direct connection of the motor/generator to the trackside power system for synchronous operation at the predetermined control speed for the shuttle unit. Acceleration of the shuttle unit to the control speed is accomplished through the IGBT rectifier/inverter circuits at which time, absent trimming control requirements, the control board engages the appropriate reversing bypass contactors for synchronous operation. When required, the control board reengages the IBGT rectifier/inverter circuits, disconnecting the reversing bypass contactors, for deceleration of the shuttle unit or grid trimming requirements as will be described in greater detail subsequently.

Control interconnection by the SCADA software in the control center is accomplished with each shuttle unit control board as previously described. Operational control of the shuttle unit is accomplished by the TCU control board 108. The control board decouples real power from reactive power for both the generator side rectifier/inverter and for the utility side rectifier/inverter. The decoupling is accomplished by using stationary to rotating transformations as is well known in the literature. In the generator side rectifier/inverter 114 (shown in FIG. 14), the reactive power is aligned with the direct axis of the generator. In the utility side rectifier/inverter 112 (shown in FIG. 14), the real power axis is aligned with the utility voltage, where as the reactive power component is 90 degrees out of phase with the utility voltage. The decoupling of the real and reactive power allows acceleration and deceleration rates, and shuttle car power rates to be controlled separately and independently from the reactive power provided by the shuttle unit. This is true even at zero speed and zero acceleration, where the real power is zero, but the reactive power remains selectable and available for utility support.

Figure 15A:
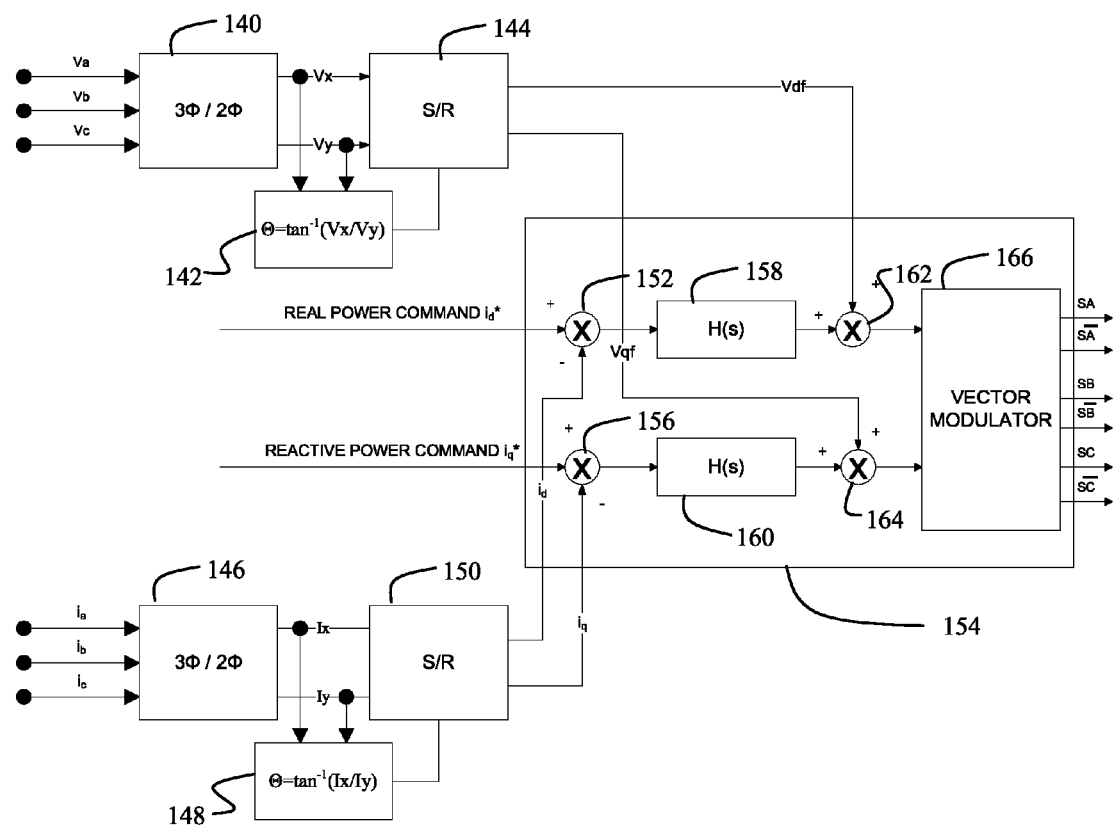
FIG. 15A is a flow chart of the operational characteristics for the shuttle unit power controller.

As shown in detail in FIG. 15A for control of each of the rectifier/inverters 112, 114, three phase voltages, Va, Vb and Vc (scaled as required) from voltage sensors 128a, 128b and 128c are received in a first phase converter 140 which provides two phase voltage outputs Vx and Vy. A phase angle calculator 142 provides phase angle θ (calculated as $\theta = \tan^{-1}(Vx/Vy)$) to a first stationary to rotating transformer 144 which provides output of a real voltage component Vdf and an imaginary voltage component Vqf. Similarly, three phase current values ia, ib and is are derived from the current sensors 126a and 126b as input to a second converter 146 which provides two phase current outputs Ix and Iy. A second phase angle calculator 148 provides phase angle θ (calculated as $\theta = \tan^{-1}(Ix/Iy)$) to a second stationary to rotating transformer 150 which provides output of a real current component Id and an imaginary current component Iq. Based on acceleration/deceleration requirements or other system requirements as will be described in greater detail subsequently, the control center SCADA provides a real power command (designated id*) which is received in a first summer 152 in an inverter rectifier controller 154 which receives the id output from the second stationary to rotating transformer 150. A reactive power command (designated iq*) is provided by the SCADA to a second summer 156 in the rectifier/inverter controller which receives the iq output from the second stationary to rotating transformer. The summed real power component is provided to a first compensator 158 and the summed reactive power component is provided to a second compensator 160. Output of the first compensator is provided to a summer 162 receiving Vdf from the first stationary to rotating transformer to provide a real voltage command Vd* and output of the second compensator is provided to a summer 164 receiving Vqf from the first stationary to rotating transformer to provide a reactive voltage command Vq*. Vd* and Vq* are provided as inputs to a vector modulator 166 which provides digital switching signals SA, SA inverse, SB, SB inverse and SC, SC inverse to the rectifier/inverters for power control. The rectifier/inverter controller for the utility side rectifier/inverter 112 receives both real and reactive power commands from the SCADA while the rectifier/inverter controller for the generator side rectifier/inverter 114 has a reactive power command set to zero.

In the presently disclosed embodiments, the rectifier/inverters are partially rated based on the motor/generator requirements to allow use of the combined IGBT reactive power control of all powered shuttle units in the system to Voltage-Ampere Reactive (VAR) power support to the utilities or independent system operators (ISOs) connected to the ARES system. At least one IGBT in each shuttle unit is connected to the high voltage transmission system through the onboard and trackside electrical systems as shown and described with respect to FIGS. 12 and 14. Real power commands (P component) from the TCU control board provide for necessary acceleration and deceleration operations of the shuttle units. The reactive power (Q component) available in the rectifier/inverter IGBTs can be controlled for reactive power input/absorption from the high voltage system as described above. For all shuttle units not producing any real power (stopped awaiting loading or transit) the entire power capability of the IGBTs in the TCU is available for reactive power. Upon command, reactive current (out of phase with the voltage input) directed through the rectifier/inverter IGBTs by the control board may be employed to create a large influence on the voltage in the electrical grid system. Voltage measurement and VAR command inputs may be derived from electrical grid control center voltage measurement at desired locations geographically separated from the ARES system.

For the exemplary embodiments, to allow VAR control even with 100% the IGBTs in operation for acceleration/deceleration or operating selected shuttle units asynchronously, inverters of approximately 4% greater capacity are employed thereby allowing 25% of rated power availability for reactive power control in response to VAR requests/requirements.

The VAR command can be generated in one of three practical ways. The first includes where the energy storage system simply commands a VAR level. This may be varying or fixed, and is often set at zero to operate the system at unity power factor. In the second approach VAR levels are command by an external operator, often the grid transmission system operator. This operator will manually command different VAR levels over the course of a day or seasonally as required. The third approach is to close a voltage regulating loop where a voltage setpoint is determined for the operating plant and this is compared against the actual operating voltage. The difference between these two levels creates an error signal which can then be used to command VAR's. The SCADA system operating in the automated control system as shown in FIG. 14 incorporates this regulation capability for the embodiments described. In this way a common or individual command can be sent to a selected number of shuttle unit rectifier/inverters necessary to accomplish the required VAR adjustment.

Figure 15B:
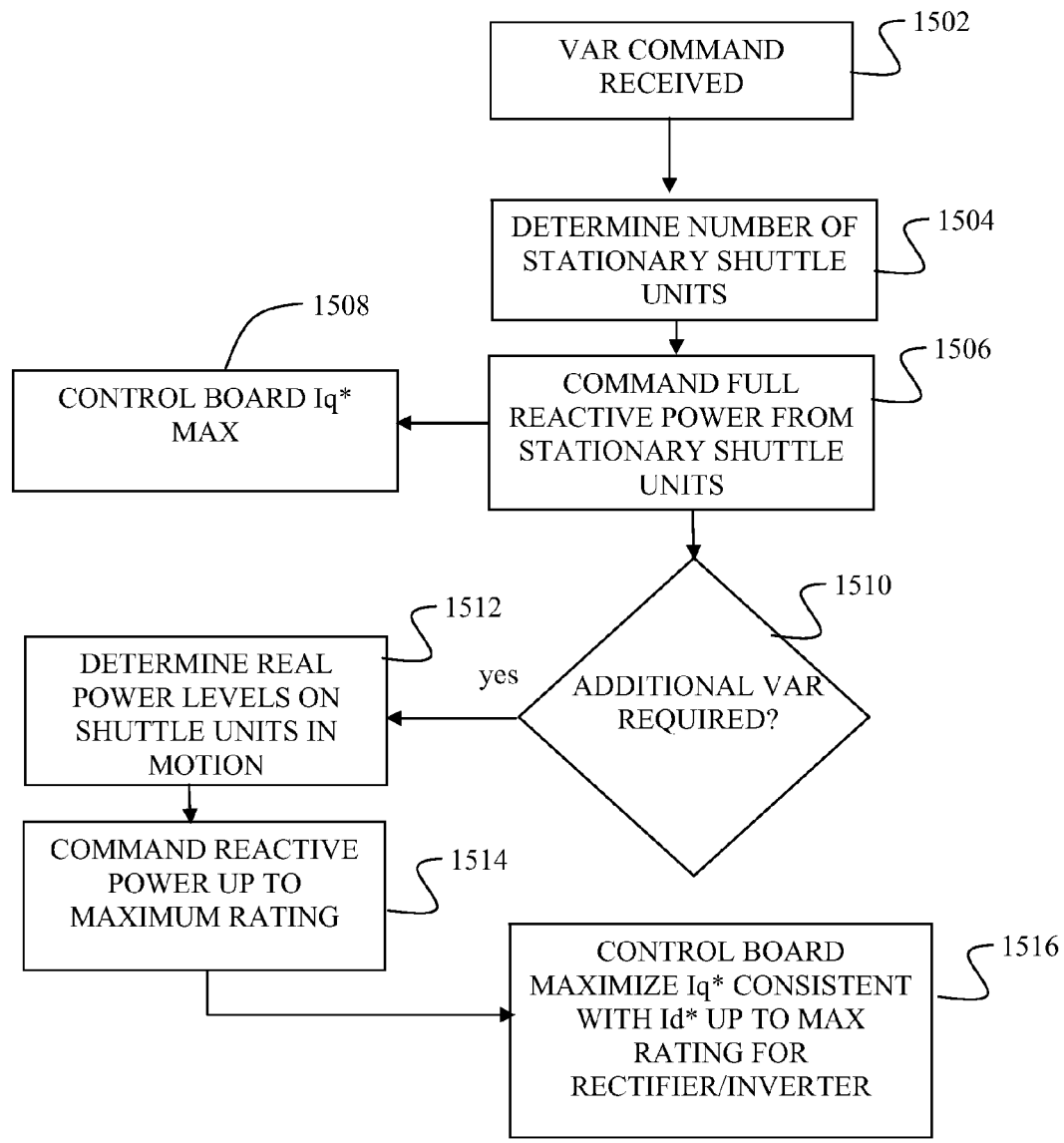
FIG. 15B is a flow chart of exemplary operations for VAR support by the system.

The VAR command is processed by the shuttle unit rectifier/inverter as shown in FIG. 15B. A VAR level command is received, step 1502, in the ARES control system from the electrical grid control center. The SCADA determines the number of shuttle units which are stationary, step 1504, and issues a command to the control boards in those shuttle units for maximum reactive power change up to the total VAR required, step 1506. The control boards in the commanded shuttle units rectifier/inverter units in those shuttle units issue Iq* commands for full reactive power, step 1508, to be produced by the utility side rectifier inverter. If additional VAR is needed beyond that which can be provided by the stationary shuttle units, step 1510, the SCADA determines real power levels on each operating shuttle unit, step 1512, and commands reactive power, up to the full rated power of the rectifier/inverters, as described above, for the shuttle units in motion, step 1514, up to the total VAR required. The control board in each shuttle unit commanded by the SCADA issues Iq* commands up to the full rated power consistent with the Id* commanded for real power in operation of the shuttle unit, Step 1516.

Similarly, while greatest efficiency in the overall ARES system can be obtained with synchronous operation of the electrified shuttle units on the power tracks, grid regulation up or regulation down and trimming of the power being stored or generated can be accomplished by operating selected shuttle units asynchronously with the TCU, as described with respect to FIGS. 14 and 15A, driving or braking the motor generator units at specific desired power. Dedication of one or more selected power tracks, as required for use in providing the amount of reg up/reg down or trimming needed, via asynchronous operation of the consists on the selected rail(s) allows speed of all consists on a given rail to be controlled while maintaining separation between consists in motion and for sequencing into and out of the storage yards. Maintaining the remaining power tracks in a synchronous operation mode retains the higher overall efficiency for remaining powered shuttle units in the system.

During generation operation of the system, rapid regulation down requirements will require initial additional braking of consists on the selected power track resulting in a power surge. To avoid placing this surge on the grid, the trackside power system as shown in FIG. 12 allows the power to be absorbed by SCADA command to the returning shuttle units to increase speed thereby incurring greater energy usage. Use of returning consists for absorbing any power surge allows immediate regulation down commands to be implemented without impact regardless of the operational status of the ARES system.

Figure 15C:
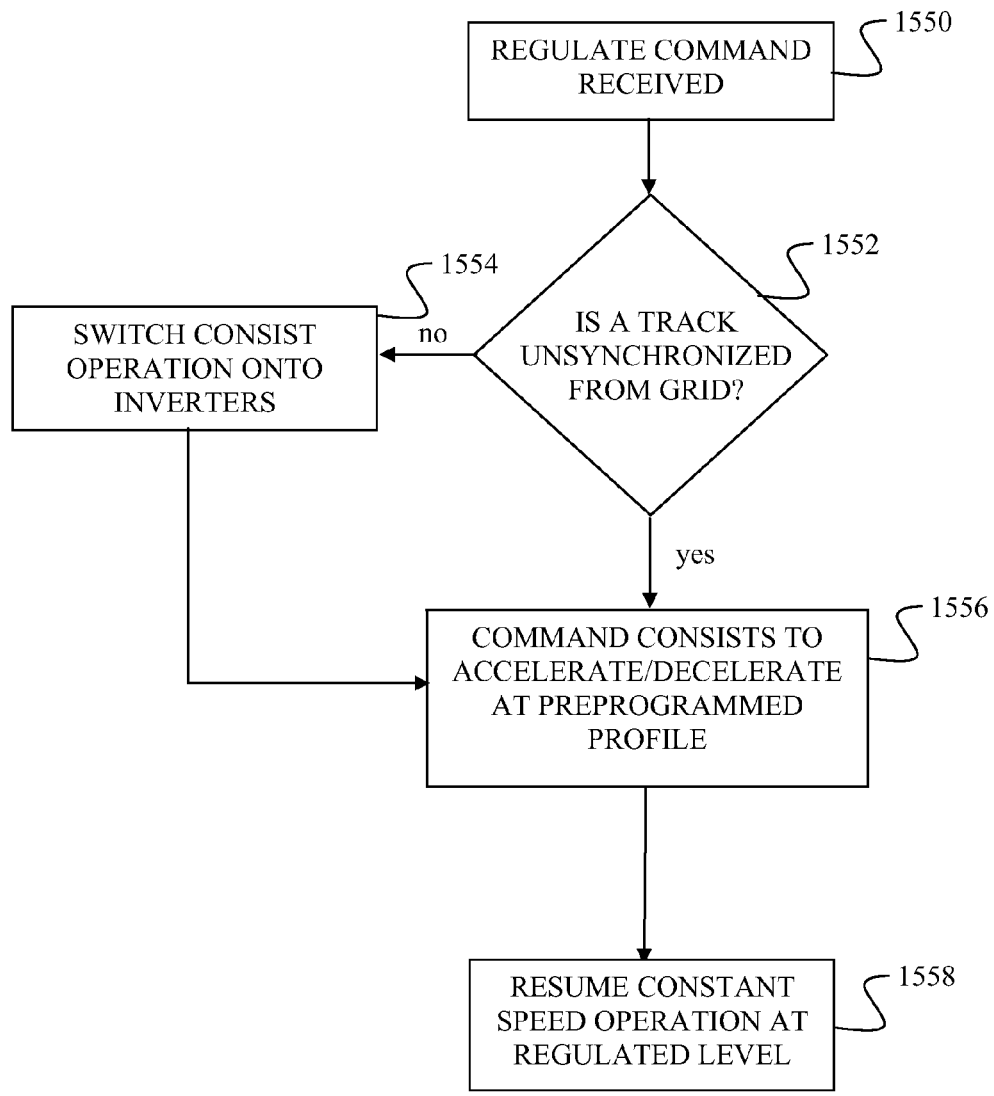
FIG. 15C is a flow chart of exemplary trimming operations for regulation up or regulation down by the system.

Operation for regulation up or regulation down and trimming is shown in FIG. 15C. When a regulate command is received, step 1550, from the electrical grid control center of a contracting utility or ISO, a determination is made if one power track is operating in the unsynchronized mode, step 1552. If not, the SCADA orders consists on a selected track to switch to rectifier/inverter operation, step 1554. After switching, or if one power track was already operating in an unsynchronized mode, the SCADA issues commands to the consists on the selected track to accelerate or decelerate on a preprogrammed profile, step 1556, wherein power consumption variation equals the commanded regulation up or regulation down. In a regulation down request where deceleration would otherwise create a spike in power consumption for that track, interconnection of the power tracks as previously described allows the excess power to be employed for powering returning shuttle unit consists on the return track. The consists then resume a constant speed operation on rectifier inverter power at the altered speed for the desired power consumption. If insufficient regulation up or regulation down is achieved by converting one power track to asynchronous operation, the SCADA will direct consists on a second power track to convert to rectifier/inverter power.

Trimming operations are accomplished within the ARES system to provide specific output or energy storage by adjusting one or more tracks in asynchronous operation for specific power consumption by the consists. Longer term trimming adjustments may be accommodated by varying the dispatch rate of consists on a given power track.

The present embodiments as described provide capability for power storage and supply as well as ancillary services such as VAR, regulation up and regulation down in a single system.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention is therefore not limited by the above described embodiment, method, and examples, but by all embodiments and methods within the scope and spirit of the invention as claimed.

What is claimed is:

1. An energy storage system comprising:
   a rail system having upper and lower storage yards with interconnecting track connecting the upper and lower yards and a plurality of track routing configuration control elements;
   a plurality of shuttle units supported by wheels and operably connected to an electrical motor and an electrical generator, said shuttle units further having a support structure and integral transfer mechanism for removably carrying masses;
   an electrical interconnection between the motors and generators and an electrical grid;
   a control system in communication with the electrical grid, the plurality of shuttle units and the rail system control elements and said control system executing a first control sequence to store energy and executing a second control sequence for providing power to the electrical grid,
   said first control sequence causing selected shuttle units to retrieve masses located in the lower storage yard and using the operably connected motor to drive the selected shuttle units from the lower storage yard to the upper storage yard, said control elements configured to route the selected shuttle units, and causing the selected shuttle units to offload the masses in the upper storage yard;
   said second control sequence causing selected shuttle units to retrieve masses located in the upper storage yard and using the operably connected generator supplying power to the grid by selective regenerative braking of the selected shuttle units from the upper storage yard to the lower storage yard, said control elements configured to route the selected shuttle units, and causing the selected shuttle units to offload the masses in the lower storage yard.

2. The energy storage system of claim 1 wherein the masses are stored in the upper and lower storage yard suspended over storage yard tracks and each shuttle unit is received under selected masses and the transfer mechanism comprises a support element carried by structure on each shuttle unit and received under the mass as stored.

3. The energy storage system of claim 2 wherein the transfer mechanism lifts and rotates the mass from a suspended storage position.

4. The energy storage system of claim 1 wherein the integral transfer mechanism comprises:
   a lever base mounted at a first end to a stanchion extending from a first bogie of each shuttle unit with a pivot pin;
   a collapsible hinge attached to the lever base proximate a second end to a second bogie of the shuttle unit;
   said hinge movable from a first collapsed position of the lever base wherein the shuttle unit may roll freely under a selected mass, to a second extended position to lift the lever base wherein the mass is lifted from a storage position.

5. The energy storage system of claim 1 wherein the integral transfer mechanism comprises:
   at least one hydraulic rams;
   a hydraulic lift incorporating a rotating engagement table positioned in the middle of the shuttle unit,
      said lift extendible from a first position to a second position to lift a mass from a storage position, said hydraulic rams movable from a first position to a second position to rotate the engagement table aligning the mass longitudinally with the shuttle unit and said lift retractable to the first position,
      said lift further extendible from the first position to the second position with the mass on the engagement table, said hydraulic rams movable from the second to the first position for orienting the mass transverse to the shuttle unit and said lift retractable to the first position for seating the mass in a storage location.

6. The energy storage system of claim 1 wherein the electrical interconnection comprises:
   a substation connected to the grid to receive high voltage power;
   a trackside electrical distribution system connected to the substation;
   a plurality of transformers connected to the electrical distribution system at selected intervals; and,
   a plurality of power supply rails connected to the transformers.

7. The energy storage system of claim 6 wherein each of the plurality of shuttle units further comprises:
   contactors for connection to the power supply rails;
   a traction control unit (TCU) including
      rectifier/inverter circuits for power control connected to the motor and generator
      a control board for control of the rectifier/inverter circuits for acceleration, deceleration and steady state operation of the motor and generator.

8. The energy storage system of claim 7 wherein the TCU further comprises:
   reversing bypass connectors responsive to a signal from the control board for selectively bypassing the rectifier inverter circuits with direct connection of the motor and generator to the power supply rail for synchronous operation.

9. The energy storage system of claim 6 wherein the rectifier/inverter circuits comprise a first utility side rectifier/inverter and a second motor and generator side rectifier/inverter and the control board further comprises means for controlling reactive power in the utility side rectifier/inverter for VAR adjustment to the electrical grid.

10. The energy storage system of claim 6 wherein the control system includes voltage adjustment signaling responsive to a utility signal for regulation up or regulation down and the TCU is responsive to said adjustment signaling from the control system for asynchronous operation.

11. The energy storage system of claim 10 wherein the interconnecting track comprises a plurality of power tracks and at least one return track, at least one of said plurality of power tracks selected for asynchronous operation of shuttle units on the at least one selected track responsive to the voltage adjustment signaling by the control system.

12. The energy storage system of claim 1 further comprising a second plurality of unpowered shuttle units selectively engaged to the first plurality of shuttle units forming consists with powered and unpowered shuttle units.

13. The energy storage system of claim 1 wherein the motor and generator are incorporated in bogey units for the supporting wheels.

14. The energy storage system of claim 1 wherein the motor and generator are combined in a single unit as a motor/generator.

15. A method for utility scale energy storage employing a rail system having upper and lower storage yards with interconnecting track connecting the upper and lower yards and a plurality of control elements for configuring track routing in the system with a plurality of shuttle units having a support structure and integral transfer mechanism for removably carrying masses, each shuttle unit operably connected to an electrical motor and an electrical generator comprising:

connecting the rail system to an electrical grid;
upon receiving a command for energy storage, controlling a selected set of the plurality of shuttle units to each load a mass from a selected storage track in the lower storage yard;
connecting the storage track to a power track;
driving the motor operably connected to each shuttle unit to lift the mass up the power track to the upper storage yard;
controlling the selected set of shuttle units to unload the masses to a selected storage track in the upper storage yard;
upon receiving a command for energy return, controlling a selected set of shuttle units each to load a mass from a selected storage track in the upper storage yard;
connecting the storage track to a power track;
regeneratively braking the generator operably connected to each shuttle unit to carry the mass down the power track to the lower storage yard;
controlling the shuttle unit to unload the mass to a selected storage track in the lower storage yard.

16. A shuttle unit for an energy storage system comprising:
a support structure mounted on wheels and operably connected to an electrical motor and an electrical generator said support structure having an integral transfer mechanism for removably carrying the masses;
an electrical interconnection between the motors and generators and an electrical grid;
a controller connected to the electrical motor and electrical generator, said controller responsive to a first control sequence to store energy and a second control sequence for providing power to the electrical grid,
said first control sequence causing the shuttle unit to retrieve a mass located in a lower storage yard and using the operably connected motor drawing power from the grid to drive the shuttle unit from the lower storage yard to the upper storage yard and causing the shuttle unit to offload the mass in the upper storage yard;
said second control sequence causing the shuttle unit to retrieve a mass located in the upper storage yard and using the operably connected generator supplying power to the grid by selective regenerative braking of the shuttle unit from the upper storage yard to the lower storage yard, and causing the shuttle unit to offload the mass in the lower storage yard.

* * * * *